United States Patent
Haitz et al.

(10) Patent No.: US 10,339,608 B1
(45) Date of Patent: Jul. 2, 2019

(54) SELECTABLE PAYROLL AMOUNTS FOR INSTANT PAYROLL DEPOSITS

(71) Applicant: Square, Inc., San Francisco, CA (US)

(72) Inventors: Zachary Haitz, San Leandro, CA (US); Jeffrey Rauch, San Francisco, CA (US); Walid Owais, Richmond, TX (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 15/800,022

(22) Filed: Oct. 31, 2017

(51) Int. Cl.
G06Q 40/00 (2012.01)
G06Q 20/10 (2012.01)
G06Q 10/06 (2012.01)

(52) U.S. Cl.
CPC ....... G06Q 40/125 (2013.12); G06Q 10/0635 (2013.01); G06Q 10/06398 (2013.01); G06Q 20/108 (2013.01)

(58) Field of Classification Search
CPC ....... G06Q 40/125; G06Q 40/00; G06Q 10/10
USPC ......................................................... 705/32
See application file for complete search history.

(56) References Cited

U.S. PATENT DOCUMENTS

| | | | |
|---|---|---|---|
| 4,408,291 A | 10/1983 | Gunzberg et al. | |
| 4,819,162 A | 4/1989 | Webb, Jr. et al. | |
| 5,459,657 A | 10/1995 | Wynn et al. | |
| 6,347,306 B1 | 2/2002 | Swart | |
| 6,411,938 B1 | 6/2002 | Gates et al. | |
| 6,681,210 B2 | 1/2004 | Kelly | |
| 6,764,013 B2 | 7/2004 | Ben-Aissa | |
| 6,802,005 B1 | 10/2004 | Berson | |
| 7,229,013 B2 | 6/2007 | Ben-Aissa | |
| 7,398,238 B1 | 7/2008 | Calce et al. | |
| 7,464,859 B1 | 12/2008 | Hawkins | |
| 8,099,359 B1 | 1/2012 | Coyle et al. | |
| 8,219,470 B1 | 7/2012 | Brown | |
| 8,271,360 B1 * | 9/2012 | Schmier | G06Q 20/405 379/88.18 |

(Continued)

OTHER PUBLICATIONS

Murdock, K., "Credit Card Processing: How It All Works," Practical Ecommerce, published Apr. 1, 2006, Retrieved from the Internet URL: https://www.practicalecommerce.com/Credit-Card-Processing-How-It-All-Works, on Jun. 21, 2018, pp. 1-3.

(Continued)

Primary Examiner — Oluseye Iwarere
(74) Attorney, Agent, or Firm — Lee & Hayes, P.C.

(57) ABSTRACT

Selectable payroll amounts for instant payroll deposits are described. A service provider can receive employee payroll information indicating an employee account at which an employee is to receive payroll payments from an employer. Additionally, the service provider can receive compensation information indicating compensation to be received by the employee for performing work for the employer. The service provider can leverage a data model to determine that the employee is eligible to receive at least a portion of the compensation via an instant deposit transfer. The service provider can determine, based on a reliability of the employee and/or a level of risk associated with the employer, an amount of the compensation to pay to the employee via the instant deposit transfer and can facilitate the instant deposit transfer of funds associated with the amount to pay the payroll payments to the employee account.

20 Claims, 12 Drawing Sheets

(56) References Cited

U.S. PATENT DOCUMENTS

| | | | |
|---|---|---|---|
| 8,326,714 B1 | 12/2012 | Teichman et al. | |
| 9,418,387 B1* | 8/2016 | Aaron | G06Q 40/125 |
| 10,007,953 B1* | 6/2018 | Nathoo | G06Q 40/125 |
| 10,083,489 B1* | 9/2018 | Nathoo | G06Q 40/125 |
| 10,127,508 B1 | 11/2018 | Hollis et al. | |
| 2001/0034676 A1 | 10/2001 | Vasic | |
| 2001/0044756 A1 | 11/2001 | Watkins et al. | |
| 2002/0069144 A1 | 6/2002 | Palardy | |
| 2002/0138424 A1 | 9/2002 | Coyle | |
| 2002/0188535 A1 | 12/2002 | Chao et al. | |
| 2003/0061162 A1* | 3/2003 | Matthews | G06Q 20/10 705/41 |
| 2003/0065618 A1* | 4/2003 | VanDeBoe, Jr. | G06Q 10/10 705/40 |
| 2003/0074287 A1* | 4/2003 | Shuder | G06Q 10/063118 705/32 |
| 2003/0074311 A1* | 4/2003 | Saylors | G06Q 20/10 705/39 |
| 2003/0093293 A1 | 5/2003 | Han | |
| 2003/0144862 A1 | 7/2003 | Smith et al. | |
| 2003/0149660 A1* | 8/2003 | Canfield | G06Q 20/10 705/39 |
| 2003/0182171 A1 | 9/2003 | Vianello | |
| 2003/0222135 A1 | 12/2003 | Stoutenburg et al. | |
| 2004/0019542 A1 | 1/2004 | Fuchs et al. | |
| 2005/0075969 A1* | 4/2005 | Nielson | G06Q 30/02 705/38 |
| 2005/0177496 A1 | 8/2005 | Blagg et al. | |
| 2005/0204470 A1 | 9/2005 | Main et al. | |
| 2006/0129617 A1* | 6/2006 | Nagai | G06F 8/656 |
| 2006/0167775 A1* | 7/2006 | Cudzilo | G06Q 20/042 705/35 |
| 2006/0229902 A1 | 10/2006 | McGovern et al. | |
| 2006/0230122 A1* | 10/2006 | Sutou | H04L 67/1097 709/219 |
| 2006/0265268 A1 | 11/2006 | Hyder et al. | |
| 2007/0136310 A1 | 6/2007 | Derrico | |
| 2007/0156577 A1 | 7/2007 | Lanham et al. | |
| 2007/0192229 A1 | 8/2007 | Rowan | |
| 2007/0260513 A1 | 11/2007 | Pavlov | |
| 2007/0262137 A1 | 11/2007 | Brown | |
| 2007/0271178 A1* | 11/2007 | Davis | G06Q 20/102 705/38 |
| 2008/0065396 A1 | 3/2008 | Marshall | |
| 2008/0149707 A1 | 6/2008 | Urcuyo | |
| 2008/0306844 A1* | 12/2008 | Jackman | G06Q 20/10 705/30 |
| 2009/0119207 A1 | 5/2009 | Grecia | |
| 2009/0127328 A1* | 5/2009 | Aissa | G06K 9/00087 235/377 |
| 2009/0132312 A1* | 5/2009 | Reinheimer | G06Q 40/02 705/311 |
| 2009/0159663 A1 | 6/2009 | Mullen et al. | |
| 2009/0192926 A1* | 7/2009 | Tarapata | G06Q 10/10 705/32 |
| 2009/0204470 A1 | 8/2009 | Weyl et al. | |
| 2009/0327013 A1 | 12/2009 | McGovern et al. | |
| 2010/0019028 A1 | 1/2010 | Books et al. | |
| 2011/0082778 A1* | 4/2011 | Dombroski | G06Q 40/02 705/32 |
| 2011/0093351 A1* | 4/2011 | Afana | G06Q 20/20 705/16 |
| 2011/0213733 A1 | 9/2011 | Cail, II | |
| 2011/0320230 A1 | 12/2011 | Podgumy et al. | |
| 2012/0010940 A1 | 1/2012 | Masi | |
| 2012/0047034 A1 | 2/2012 | Luongo et al. | |
| 2012/0054088 A1* | 3/2012 | Edrington | G06Q 40/025 705/38 |
| 2012/0150725 A1* | 6/2012 | Moebs | G06Q 10/10 705/38 |
| 2012/0209754 A1 | 8/2012 | Sivasubramaniam | |
| 2012/0239553 A1* | 9/2012 | Gonen | G06Q 40/02 705/38 |
| 2012/0278212 A1* | 11/2012 | Upadhyaya | G06Q 10/00 705/32 |
| 2013/0013371 A1 | 1/2013 | Katsakhyan et al. | |
| 2013/0041810 A1 | 2/2013 | Murrell et al. | |
| 2013/0290127 A1 | 10/2013 | Finseth | |
| 2014/0095310 A1 | 4/2014 | Slonimsky et al. | |
| 2014/0129398 A1 | 5/2014 | Naik et al. | |
| 2014/0162598 A1 | 6/2014 | Villa-Real | |
| 2014/0180919 A1* | 6/2014 | Brown | G06Q 20/1085 705/42 |
| 2014/0207635 A1* | 7/2014 | Pappas | G06Q 10/109 705/32 |
| 2014/0244489 A1 | 8/2014 | Kessler et al. | |
| 2015/0046228 A1 | 2/2015 | Lamb et al. | |
| 2015/0066699 A1 | 3/2015 | Fisher | |
| 2015/0127569 A1 | 5/2015 | Baldwin et al. | |
| 2015/0170163 A1 | 6/2015 | Wagner et al. | |
| 2015/0248649 A1 | 9/2015 | Avats | |
| 2016/0027068 A1 | 1/2016 | Brantley et al. | |
| 2016/0027126 A1* | 1/2016 | Blowers | G06Q 40/123 705/31 |
| 2016/0055583 A1 | 2/2016 | Liberty et al. | |
| 2016/0086261 A1* | 3/2016 | Shah | G06Q 40/025 705/38 |
| 2016/0371661 A1* | 12/2016 | Shah | G06Q 10/105 |
| 2018/0130081 A1 | 5/2018 | Stepanovich | |

OTHER PUBLICATIONS

Non-Final Office Action dated Aug. 26, 2014, for U.S. Appl. No. 14/106,439, of Aaron, P., et al., filed Dec. 13, 2013.
Non-Final Office Action dated Jan. 9, 2015, for U.S. Appl. No. 14/334,507, of Nathoo, A., et al., filed Jul. 17, 2014.
Non-Final Office Action dated Feb. 26, 2015, for U.S. Appl. No. 14/334,455, of Nathoo, A., et al., filed Jul. 17, 2014.
Final Office Action dated Mar. 4, 2015, for U.S. Appl. No. 14/106,439, of Aaron, P., et al., filed Dec. 13, 2013.
Non-Final Office Action dated Apr. 27, 2015, for U.S. Appl. No. 14/183,450, of Rose, C., et al., filed Feb. 18, 2014.
Advisory Action dated Jun. 4, 2015 for U.S. Appl. No. 14/106,439, of Aaron, P., et al., filed Dec. 13, 2013.
Final Office Action dated Jul. 10, 2015, for U.S. Appl. No. 14/334,507, of Nathoo, A., et al., filed Jul. 17, 2014.
Non-Final Office Action dated Aug. 13, 2015, for U.S. Appl. No. 14/334,455, of Nathoo, A., et al., filed Jul. 17, 2014.
Non-Final Office Action dated Sep. 11, 2015, for U.S. Appl. No. 14/106,439, of Aaron, P., et al., filed Dec. 13, 2013.
Non-Final Office Action dated Sep. 24, 2015, for U.S. Appl. No. 14/591,839, of Nathoo, A., et al., filed Jan. 7, 2015.
Final Office Action dated Oct. 26, 2015, for U.S. Appl. No. 14/183,450, of Rose, C., et al., filed Feb. 18, 2014.
Non-Final Office Action dated Nov. 6, 2015, for U.S. Appl. No. 14/334,507, of Nathoo, A., et al., filed Jul. 17, 2014.
Non-Final Office Action dated Nov. 23, 2015, for U.S. Appl. No. 14/591,839, of Nathoo, A., et al., filed Jan. 7, 2015.
Non-Final Office Action dated Mar. 18, 2016, for U.S. Appl. No. 14/334,455, of Nathoo, A., et al., filed Jul. 17, 2014.
Notice of Allowance dated Mar. 28, 2016, for U.S. Appl. No. 14/106,439, of Aaron, P., et al., filed Dec. 13, 2013.
Final Office Action dated Apr. 5, 2016, for U.S. Appl. No. 14/334,507, of Nathoo, A., et al., filed Jul. 17, 2014.
Non-Final Office Action dated May 19, 2016, for U.S. Appl. No. 14/591,839, of Nathoo, A., et al., filed Jan. 7, 2015.
Non-Final Office Action dated Aug. 23, 2016, for U.S. Appl. No. 14/183,450, of Rose, C., et al., filed Feb. 18, 2014.
Final Office Action dated Sep. 26, 2016, for U.S. Appl. No. 14/334,455, of Nathoo, A., et al., filed Jul. 17, 2014.
Final Office Action dated Jan. 4, 2017, for U.S. Appl. No. 14/591,839, of Nathoo, A., et al., filed Jan. 7, 2015.
Advisory Action dated Jan. 18, 2017, for U.S. Appl. No. 14/334,455, of Nathoo, A., et al., filed Jul. 17, 2014.
Non-Final Office Action dated Jan. 20, 2017, for U.S. Appl. No. 14/334,507, of Nathoo, A., et al., filed Jul. 17, 2014.

(56) References Cited

OTHER PUBLICATIONS

Non-Final Office Action dated Jan. 20, 2017, for U.S. Appl. No. 14/334,488, of Nathoo, A., et al., filed Jul. 17, 2014.
Final Office Action dated Mar. 10, 2017, for U.S. Appl. No. 14/183,450, of Rose, C., et al., filed Feb. 18, 2014.
Non-Final Office Action dated Mar. 23, 2017, for U.S. Appl. No. 14/334,455, of Nathoo, A., et al., filed Jul. 17, 2014.
Final Office Action dated Jun. 9, 2017, for U.S. Appl. No. 14/334,488, of Nathoo, A., et al., filed Jul. 17, 2014.
Non-Final Office Action dated Jul. 13, 2017, for U.S. Appl. No. 14/591,839, of Nathoo, A., et al., filed Jan. 7, 2015.
Final Office Action dated Aug. 17, 2017, for U.S. Appl. No. 14/334,507, of Nathoo, A., et al., filed Jul. 17, 2014.
Non-Final Office Action dated Oct. 2, 2017, for U.S. Appl. No. 14/245,781, of Nathoo, A., filed Apr. 4, 2014.
Non-Final Office Action dated Oct. 4, 2017, for U.S. Appl. No. 14/183,450, of Rose, C., et al., filed Feb. 18, 2014.
Final Office Action dated Oct. 6, 2017, for U.S. Appl. No. 14/334,455, of Nathoo, A., et al., filed Jul. 17, 2014.
Non-Final Office Action dated Dec. 27, 2017, for U.S. Appl. No. 14/595,932, of Hollis, C., et al., filed Jan. 13, 2015.
Advisory Action dated Jan. 4, 2018, for U.S. Appl. No. 14/334,455, of Nathoo, A., et al., filed Jul. 17, 2014.
Final Office Action dated Jan. 25, 2018, for U.S. Appl. No. 14/591,839, of Nathoo, A., et al., filed Jan. 7, 2015.
Notice of Allowance dated Feb. 22, 2018, for U.S. Appl. No. 14/334,455, of Nathoo, A., et al., filed Jul. 17, 2014.
Non-Final Office Action dated Apr. 2, 2018, for U.S. Appl. No. 14/334,488, of Nathoo, A., et al., filed Jul. 17, 2014.
Final Office Action dated Apr. 5, 2018, for U.S. Appl. No. 14/183,450, of Rose, C., et al., filed Feb. 18, 2014.
Final Office Action dated May 16, 2018, for U.S. Appl. No. 14/245,781, of Nathoo, A., filed Apr. 4, 2014.
Notice of Allowance dated May 21, 2018, for U.S. Appl. No. 14/591,839, of Nathoo, A., et al., filed Jan. 7, 2015.
Advisory Action dated Jun. 29, 2018, for U.S. Appl. No. 14/183,450, of Rose, C., et al., filed Feb. 18, 2014.
Notice of Allowance dated Jul. 10, 2018, for U.S. Appl. No. 14/595,932, of Hollis, C., et al., filed Jan. 13, 2015.
Advisory Action dated Jul. 27, 2018, for U.S. Appl. No. 14/245,781, of Nathoo, A., filed Apr. 4, 2014.
Final Office Action dated Oct. 11, 2018, for U.S. Appl. No. 14/334,488, of Nathoo, A., et al., filed Jul. 17, 2014.
Non Final Action dated Nov. 16, 2018, for U.S. Appl. No. 15/189,745, of Aaron, P., et al., filed Jun. 22, 2016.
Advisory Action dated Dec. 19, 2018, for U.S. Appl. No. 14/334,488, of Nathoo, A., et al., filed Jul. 17, 2014.
Non Final Action dated Mar. 11, 2019, for U.S. Appl. No. 14/245,781, of Nathoo, A., filed Apr. 4, 2014.

\* cited by examiner

US 10,339,608 B1

SELECTABLE PAYROLL AMOUNTS FOR INSTANT PAYROLL DEPOSITS

BACKGROUND

Employees of many businesses are typically paid on a weekly, biweekly, or monthly basis. For example, a business can hire a payroll service that determines the amount of compensation due to each employee, such as based on the number of hours worked, a salary, taxes to be withheld, and so forth. A total amount to be paid out for the payroll can then be transferred from the bank of the business to the bank of the payroll service to be used to make payroll payments. When the funds have been received at the bank of the payroll service, the payroll service pays the employee(s), such as by check or direct deposit, often a week or more after the work was actually performed by the employee(s).

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
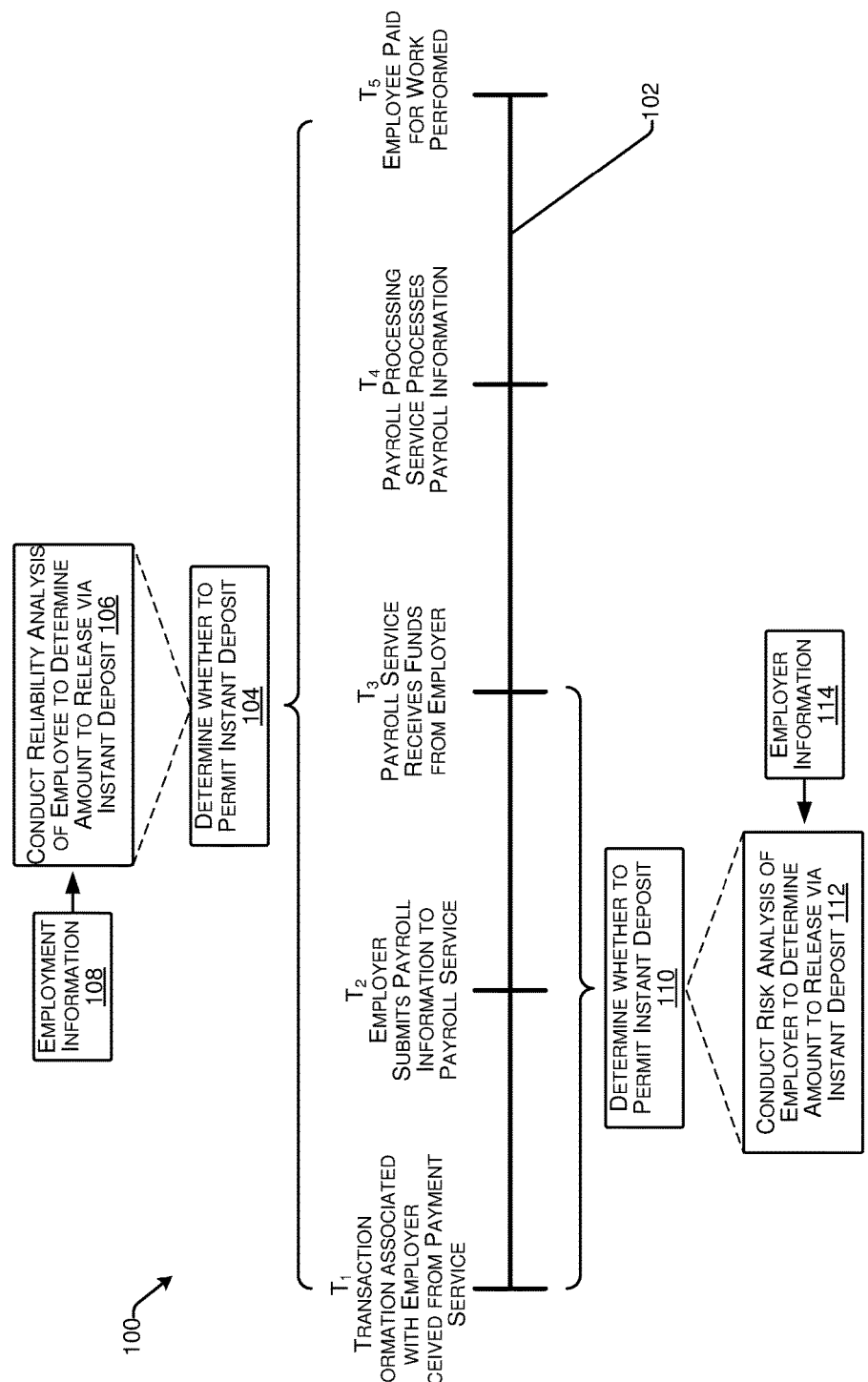
FIG. 1 illustrates an example process for a payroll service according to some implementations.

Techniques described herein are directed to selectable payroll amounts for instant payroll deposits. In at least one example, techniques described herein enable a service provider to make payroll payments to employee(s) on behalf of an employer via a payroll service. As described above, the payroll service can facilitate the transfer of a total amount to be paid out for the payroll of an employee from the bank of the employer to the bank of the payroll service to be used to make payroll payments. Typically, when the funds have been received at the bank of the payroll service, the payroll service can pay the employee, such as by check or direct deposit, often a week or more after when the work was actually performed by the employee. For the purpose of this discussion, this timeline associated with receiving funds at the bank of the payroll service and paying the employee can be called a "typical payment cycle." Techniques described herein can enable employee(s) to receive payment faster than current techniques allow (i.e., outside of the typical payment cycle), while mitigating risk assumed by the service provider and/or the employer.

In at least one example, a service provider can offer various services, such as a payroll service, a payment service, etc. As described above, the payroll service can be utilized to make payroll payments to employee(s) on behalf of an employer. The payment service can offer services to a business of the employer to enable payment processing for point-of-sale (POS) transactions. For instance, the employer can be a merchant, and the service provider can provide the payment service to the employer. The payment service can include the provision of payment processing software, payment processing hardware and/or payment processing services to the merchant to enable the merchant to receive payments from customers when conducting POS transactions with customers. For instance, the payment service can enable the employer to receive cash payments, payment card payments, and/or electronic payments from customers for POS transactions.

In addition, the data from the payment service can be used by the payroll service to determine payroll payments that are due to be paid to particular employee(s) of the employer. For example, the payment service can receive data that includes time worked by an employee, sales made by the employee, gratuities received by the employee, and so forth. The payroll service can directly receive the data from the payment service to calculate the payroll payment due to be paid to the particular employee without any manual action or input from the employer. For example, the payroll service can use the data from the payment service to determine whether the employee is due to be paid a sales commission based on the amount of sales made while the employee is logged in to, or otherwise determined to be using a particular employer POS device on which identified sales are generated. Further, gratuities can be tracked and distributed according to one or more gratuity distribution rules provided by the employer. Accordingly, same-day payroll payments (or otherwise early payroll payments) can be made to the employee(s), and the payments can include commissions and/or gratuities due to be paid to the employee(s) based on the work performed by the employee(s) on that same day (or within a particular pay period).

In some instances, the payroll service can pay the employee(s) without waiting to receive a transfer of funds from the employer's bank. In at least one example, the payroll service can determine whether to pay the employee(s) using near real-time payments (or payments otherwise paid outside of the typical payment cycle) and/or an amount that is to be paid out to the employee(s) based on a risk analysis of the employer's financial position. For example, the service provider can determine risk associated with an employer based at least in part on information available through the payment service. An employer's level of risk can determine whether the employer can utilize near real-time payroll payment options (or other early payment options) and/or an amount the employer can pay out in near real-time (or at another time outside of the typical payment cycle). In at least one example, the payroll service can dynamically modify an amount that is to be paid out to employee(s) based at least in part on risk associated with an employer. That is, in some examples, the payroll service can withhold at least a portion of an amount to be paid out to employee(s) until a later time based at least in part on risk associated with the employer.

In additional and/or alternative examples, the payroll service can determine whether to pay the employee(s) using the near real-time payments (or payments otherwise outside of the typical payment cycle) and/or an amount that is to be paid out to the employee(s) based on a reliability analysis of the employee(s). For example, the payroll service can access information associated with employee(s) (e.g., historical employee information, current employee information, etc.) and can determine reliability of the employee(s) based at least in part on information associated with the employee(s). An employee's level of reliability can determine whether the employee can receive payment in near real-time (or via another early payment option) and/or an amount of payment that the employee can receive in near real-time (or at another time outside of the typical payment cycle). In at least one example, the payroll service can dynamically modify an amount that is to be paid out to individual employee(s) based at least in part on the reliability associated with the individual employee(s). That is, in some examples, the payroll service can withhold at least a portion of an amount to be paid out to individual employee(s) until a later time based at least in part on the reliability associated with the individual employee(s).

As described above, techniques described herein can enable employee(s) to receive payment faster than current techniques allow (i.e., outside of the typical payment cycle), while mitigating risk assumed by the service provider and/or the employer by providing payments outside of the typical payment cycle. That is, as identified above, with current payroll technologies, there is a significant time lag between when an employee performs work and when the employee is paid for the work performed. Such a time lag is necessary due to the time required for funds to be transferred between banks (e.g., from a bank of an employer to a bank of the payroll service and from a bank of the payroll service to a bank of the employee) to mitigate risk.

For instance, in some examples, if a payroll service pays an employee without first receiving funds from the employer (e.g., prior to the transfer of funds from the bank of the employer to the bank of the payroll service), the payroll payments can equate to a cash advance from the service provider to the employer since funds for the payroll payments can be removed from a service provider account at least several days before the funds are received from an employer account. Thus, the service provider can be taking on some risk, such as that the employer can go out of business before repaying the service provider, the employer may not have sufficient funds to repay the service provider, an employee can have fraudulently claimed to work more hours than were actually worked, an employee can have fraudulently increased his or her compensation amount, and so forth.

Furthermore, early payment to employee(s) depletes the employer's cash flow, thereby exposing the employer to risk. As such, techniques described herein are directed to performing risk and/or reliability analyses to mitigate the risk to which the service provider and/or the employer are exposed. That is, techniques described herein are directed to leveraging risk and/or reliability analyses to dynamically modify the timing of payroll payments and/or the amount of funds paid via near real-time (or otherwise early) payroll payments. Accordingly, techniques described herein are directed to improvements to current payroll systems and enable more intelligent and faster payroll processing for employee and employers, while mitigating risk.

For discussion purposes, some example implementations are described in the environment of a service computing device that provides a payroll service and a payment service to an employer, such as for enabling payroll payments that are more frequent or more convenient than with conventional payroll services. However, implementations herein are not limited to the particular examples provided, and can be extended to other environments, other system architectures, other applications, and so forth, as will be apparent to those of skill in the art in light of the disclosure herein. For instance, while some examples are described in an environment of transferring money to a bank account of an employee via several near real-time techniques, other techniques for moving money in near real-time can alternatively be used in some environments.

FIG. 1 illustrates an example process 100 for a payroll service according to some implementations.

As described above, techniques described herein enable a service provider to make payroll payments to employee(s) on behalf of an employer via a payroll service. As described above, the payroll service can facilitate the transfer of a total amount to be paid out for the payroll of an employee to the bank of a payroll service to be used to make payroll payments. In at least one example, the funds can be transferred from the bank of the employer to the bank of the payroll service, and ultimately to a bank of the employee. In other examples, the funds can be transferred from the bank of the payroll service to the bank of the employee (e.g., the service provider can float a payroll payment on behalf of the employer). A "typical payment cycle," for the purpose of this discussion, is illustrated on a timeline 102.

In at least one example, at a first time ($T_1$), a payment service associated with the service provider can receive transaction information associated with an employer. The payment service can offer services to a business of the employer to enable payment processing for POS transactions. For instance, the employer can be a merchant, and the service provider can provide the payment service to the employer. In at least one example, data from the payment service (e.g., transaction information) can be used by the payroll service to determine payroll payments that are due to be paid to particular employee(s) of the employer. For example, the payment service can receive data that includes time worked by an employee, sales made by the employee, gratuities received by the employee, and so forth. The payroll service can directly receive the data from the payment service to calculate the payroll payment due to be paid to the particular employee without any manual action or input from the employer. For example, the payroll service can use the data from the payment service to determine whether the employee is due to be paid a sales commission based on the amount of sales made while the employee is logged in to, or otherwise determined to be using a particular employer POS device on which identified sales are generated. Further, gratuities can be tracked and distributed according to one or more gratuity distribution rules provided by the employer.

At a second time ($T_2$), the employer submits payroll information to a payroll service. For the purpose of this discussion, payroll information includes, but is not limited to employee payroll information and compensation information. The employee payroll information can include a list of one or more employee(s) of the employer, including employee names or other employee identifiers. The employee payroll information can further include tax information, such as a taxpayer identification number (e.g., Social Security Number (SSN)) for each employee, tax withholding information for federal and state taxes, residence information, bank account information, desired payroll payment frequencies according to which individual employee(s) are to be paid, and so forth.

The compensation information can include an indication of an amount that each employee is to be paid, including wages, salary, bonuses, commission, tips or other gratuities, garnishments, and the like. For example, the compensation information can include whether a particular employee is paid by the hour or by a salary, how much the employee is to be paid, whether the employee is eligible for overtime, whether the employee is eligible for a commission or bonus, whether the employee receives gratuity income, and so forth. Furthermore, the compensation information can include one or more employer-established rules for making payments to the employee(s), such as conditions under which commissions or bonuses can be paid, rules for distributing gratuity income, and so forth.

While the second time ($T_2$) is shown as occurring after the first time ($T_1$), in additional and/or alternative examples, the second time ($T_2$) can be at a time before the first time ($T_1$) or can occur at substantially the same time as the first time ($T_1$).

At a third time ($T_3$) after the first time ($T_1$) and second time ($T_2$), the payroll service receives funds from the employer. That is, a bank associated with the payroll service receives funds from a bank associated with the employer. In at least one example, the bank associated with the employer can transfer funds to the bank associated with the service provider (and accordingly, payroll service), using any suitable money transferring technique, such as, but not limited to, a batch-processed transfer of funds.

At a fourth time ($T_4$), which can be after the third time ($T_3$), the payroll service processes the payroll information to determine an amount of funds that is to be paid to one or more employee(s) of the employer. In some examples, the payroll service can process the payroll information at any time after the payroll service receives the payroll information and/or transaction information. In at least one example, the payroll service can determine payroll processing information, based at least in part on the payroll information and/or transaction information received. The payroll processing information can include amounts of payroll payments due to be paid to each employee, amounts of taxes to withhold for each employee, when to make a payroll payment to each employee, how to make the payroll payments to each employee (e.g., check, direct deposit, etc.), and so forth. Furthermore, the payroll processing information can include an amount of time worked by individual employee(s) over a most recent pay period (e.g., in the example that the employee(s) work for an hourly wage), sales totals for individual employee(s) (e.g., in the example that the employee(s) work for sales commissions), gratuity information for individual employee(s) (e.g., in the example that the employee(s) receive gratuities), etc.

At a fifth time ($T_5$) after the fourth time ($T_4$), a payroll service pays an employee for work performed for the employer. As described above, the payroll service can pay the employee, such as by check or direct deposit into an account associated with the employee, often one week or more after when the work was actually performed by the employee. The payroll service can utilize the payroll processing information and/or the payroll information for paying the employee. In some example, the fifth time ($T_5$) can be determined based on a payment schedule specified by the employee and/or employer.

For the purpose of this discussion, a payment made to an employee prior to the fifth time ($T_5$) can be called an "instant deposit." An instant deposit can include near real-time payments (e.g., payments paid at or near the time work is performed ($\sim T_1$) or completed by an employee) or payments at any other time ($T_2 \sim T_4$) prior to the fifth time ($T_5$). In at least one example, an instant deposit is a payment made responsive to an instruction to make a payment (e.g., a request for an instant deposit). For the purpose of this discussion, an "instant deposit" can also be called an "instant deposit transfer." That is, either term can be used to describe the process of transferring funds to an account of an employee at a time prior to the fifth time ($T_5$).

As described above, in at least one example, the payroll service can determine whether to pay employee(s) using instant deposit. That is, not all employee(s) may be eligible for receiving payment via instant deposit. As described above, in at least one example, the payroll service can determine whether an employee is eligible to utilize instant deposit and/or an amount that is to be paid out to the employee via an instant deposit based on a reliability analysis of the employee. That is, as illustrated in block 104, the payroll service can determine whether to permit instant deposit prior to the fifth time ($T_5$), when an employee would typically be paid. To determine whether to permit instant deposit and/or to what extent instant deposit can be used, the payroll service can conduct a reliability analysis of the employee to determine an amount to release to the employee via instant deposit, as illustrated in block 106.

In at least one example, the reliability analysis can consider an employment history of an employee, a length of employment with the employer, a current and/or future work schedule of the employee, a number of hours worked by employee, attendance of the employee, feedback associated with the employee, evaluations of the employee, etc. to determine whether the employee is a reliable employee. In such an example, the service provider can access employee information 108, train a reliability data model based on the employee information 108, and utilize the reliability data model to analyze the reliability of the employee. Based at least in part on the outcome of the reliability analysis, the payroll service can determine whether the employee can receive payment via instant deposit and/or an amount that the employee can receive via the instant deposit. In at least one example, an employee can be determined to be eligible for instant deposit if the reliability of the employee meets or exceeds (or otherwise satisfies) a threshold. If an employee is determined to be eligible for instant deposit, the payroll service can send a notification (e.g., a text message, an email, a push notification, etc.) to a device operated by the employee to notify the employee that he or she is eligible for instant deposit. Or, if an employee is determined to be eligible for instant deposit, the payroll service can instantly deposit funds in an account of the employee, as described above. In at least one example, the outcome of the reliability analysis can affect an amount that is to be paid to the employee via an instant deposit, which may be an amount smaller than the total amount of compensation owed to the employee for the current pay period.

Additionally, in some examples, the service provider can pay employee(s) without waiting to receive a transfer of funds from an employer's bank. In at least one example, the service provider can determine whether an employer is eligible to provide instant deposits to its employees, as illustrated in block 110. As described above, in at least one example, a payroll service can determine whether to pay employee(s) via instant deposit and/or an amount that is to be paid out to the employee(s) based on a risk analysis of the employer. In at least one example, the risk analysis can consider value (or predicted value) of business(es) of the employer, amounts (or predicted amounts) of funds in account(s) of the employer, debits (or predicted debits) of the employer, a length of time business(es) of the employer have been open for business, a chargeback history of the employer, a fraud history of the employer, feedback associated with the employer, inventory of the employer, etc. In such an example, the service provider can access employer information 114, train a risk data model based on the employer information 114, and utilize the risk data model to analyze risk associated with the employer. In some examples, the payroll service can determine that an employer is eligible to provide instant deposits based at least in part on the risk determined for the employer being below (or otherwise satisfying) a threshold. Furthermore, the outcome of the risk analysis can affect an amount that is to be paid to the employee via an instant deposit.

Techniques described herein leverage risk and/or reliability analyses to enable an employee to receive payment for at least a portion of a total payment owed to the employee prior to a payday associated with the typical payment cycle (e.g., the fifth time ($T_5$)). As described above with reference to FIG. 1, the payroll service can determine that an employer is associated with a risk that is below a threshold in order to be eligible to provide instant deposits for the employer's employee(s). Furthermore, the payroll service can determine that an employee is associated with a reliability that meets or exceeds a threshold in order for the employee to be eligible for instant deposits. If an employee requests an instant deposit, the amount of the instant deposit can be determined by the reliability of the employee and/or the risk associated with the employer. For instance, in at least one example, a data model, that can be trained utilizing a machine learning mechanism, can be used to determine the amount of total payment owed to the employee that can be paid via instant deposit. As such, techniques described herein can enable employee(s) to receive payment faster than current techniques allow (i.e., outside of the typical payment cycle), while mitigating risk assumed by the service provider and/or the employer. Additional details associated with process 100 are described below with reference to FIGS. 2-11.

It should be noted that the timeline 102 is but one example of a typical payment cycle and additional and/or alternative payment cycles can be imagined.

Figure 2:
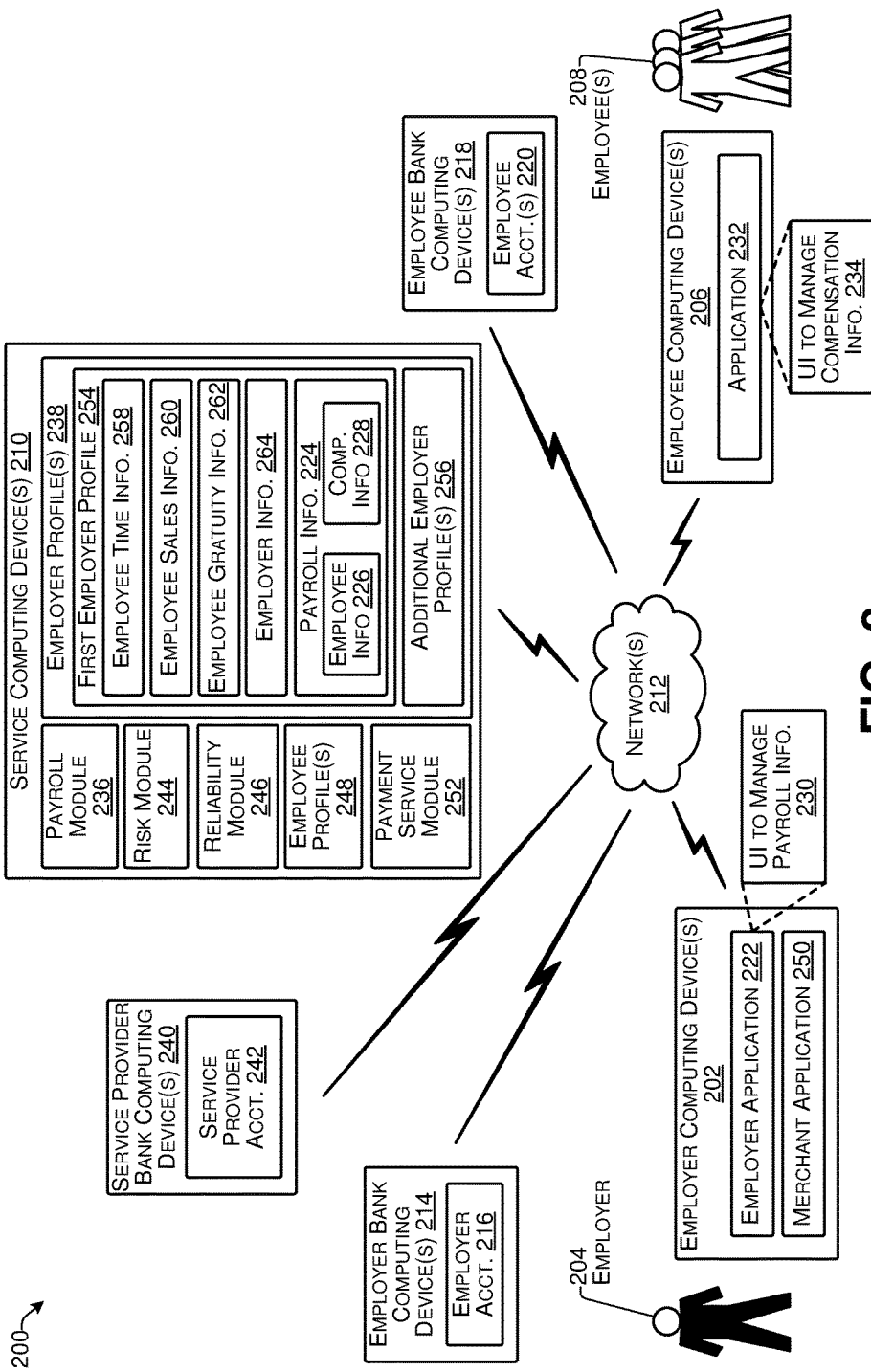
FIG. 2 illustrates an example environment for a payroll service according to some implementations.

FIG. 2 illustrates an example environment 200 for a payroll service according to some implementations. The environment 200 includes one or more employer computing devices 108 operated by an employer 204 (or an agent of the employer). Additionally, the environment 200 includes one or more employee computing devices 206 respectively operated by one or more employees 208. Furthermore, the environment 200 includes one or more service computing devices 210, associated with a service provider, which can be communicatively coupled to the employer computing device(s) 202 and/or the employee computing device(s) 206 via one or more networks 212. In at least one example, the environment 200 can further include one or more employer bank computing devices 214, which can store information associated with at least an employer account 216 associated with the employer 204, and one or more employee bank computing devices 218, which can store information associated with one or more employee accounts 220, respectively corresponding to the one or more employees 208.

In at least one example, the employer computing device(s) 202 can be associated with an employer application 222 configured to execute on the employer computing device(s) 202. As described above, the employer computing device(s) 202 can be associated with a particular employer 204. The employer 204 can have a business that employs one or more employee(s) 208. As used herein, an employee can include any individual hired by an employer 204 to perform work in exchange for payroll payments, and can include an individual employed by the employer 204 in the past, an individual presently employed by the employer 204, or an individual to be employed by the employer 204 in the future. Further, in some examples, an employee can include an independent contractor or agent that receives payroll payments from the employer 204. In addition, an employer 204 can be any entity that hires employee(s) 208 to perform work and pays the employee(s) 208 according to payroll information 224.

The payroll information 224 can include employee payroll information 226 and compensation information 228, as described above. The employee payroll information 226 can include a list of one or more employees 208 of the employer 204, including employee names or other employee identifiers. The employee payroll information 226 can further include tax information, such as a taxpayer identification number (e.g., Social Security Number (SSN)) for each employee, tax withholding information for federal and state taxes, residence information, bank account information, desired payroll payment frequencies according to which individual employee(s) are to be paid, and so forth. The compensation information 228 can include an indication of an amount that each employee is to be paid, including wages, salary, bonuses, commission, tips or other gratuities, garnishments, and the like. For example, the compensation information 228 can include whether a particular employee is paid by the hour or by a salary, how much the employee is to be paid, whether the employee is eligible for overtime, whether the employee is eligible for a commission or bonus, whether the employee receives gratuity income, and so forth. Furthermore, the compensation information 228 can include one or more employer-established rules for making payments to the employee(s) 208, such as conditions under which commissions or bonuses can be paid, rules for distributing gratuity income, and so forth.

In some examples, the employer application 222 can present a user interface (UI) 230 to enable the employer 204 to, among other things, manage the payroll information 224, including the employee payroll information 226 and the compensation information 228. In some examples, the employer application 222 can be a web browser, or the like, that enables the employer 204 to access and manage the payroll information 224 via one or more webpages. In other examples, the employer application 222 can be an application, such as a mobile application or desktop application, which is provided by the service provider, or which can be an otherwise dedicated application. Further, in some examples, the employer application 222 can also function as, or can be able to operate concurrently with, a merchant application, described below, to enable the employer 204 and/or employee(s) 208 to conduct POS transactions, such as for the sale of goods and/or services (goods and/or services are referred to hereinafter as "items") in association with payment services offered by the service provider.

In at least one example, the employee computing device(s) 206 can be associated with an application 232 which can present a UI 234 to enable a respective employee to, among other things, manage the compensation information 228. In some examples, the application 232 can be a web browser, or the like, that enables the employee to access and manage the compensation information 228 via one or more webpages. In other examples, the application 232 can be an application, such as a mobile application or desktop application, which is provided by the service provider, or which can be an otherwise dedicated application.

The service computing device 210 can include a payroll module 236 that is able to receive employer information from the employer 204, including the payroll information 224. The payroll module 236 can save the employer information in respective employer profile(s) 238, such that each employer profile can be associated with a respective employer. In at least one example, the payroll module 236 can determine payroll processing information based at least in part on the payroll information 224 and/or transaction information received from, e.g., the employer computing device(s) 202.

In additional and/or alternative examples, the payroll processing information can be provided by the employer 204 from the employer computing device(s) 202. In such examples, the payroll processing information can be sent to the service computing device(s) 210 automatically (e.g., without any input from the employer 204). For instance, the employer 204 can provide a scheduling rule which indicates when payroll processing information is to be sent to the service computing device(s) 210. In other examples, the payroll processing information can be sent to the service computing device(s) 210 responsive to a request and/or reminder to send payroll processing information and an input from the employer 204 to send the payroll processing information.

The payroll processing information can include amounts of payroll payments due to be paid to each employee, amounts of taxes to withhold for each employee, when to make a payroll payment to each employee, how to make the payroll payments to each employee (check, direct deposit, etc.), and so forth. Furthermore, the payroll processing information determined and/or received by the payroll module 236 can include an amount of time worked by individual employee(s) over a most recent pay period (e.g., in the example that the employee(s) work for an hourly wage), sales totals for individual employee(s) (e.g., in the example that the employee(s) work for sales commissions), gratuity information for individual employee(s) (e.g., in the example that the employee(s) receive gratuities), etc.

As a non-limiting example, suppose that an employee performs work for the employer 204 for a first amount of time over a pay period, and that payroll processing information is sent to the service computing device(s) 210. The payroll module 236 can receive the payroll processing information, and can determine the amount of compensation due to be paid (e.g., owed) to the employee based on the payroll processing information for the current pay period.

In some examples, the payroll module 236 can send a compensation confirmation request to the employer computing device(s) 202, to provide the employer 204 with the opportunity to check and/or approve the amount of compensation to be paid to each employee. For instance, the compensation confirmation request can be presented in the UI 230 by the employer application 222. The employer 204 can check the compensation due to be paid to each employee and can send a compensation confirmation back to the service computing device 210 to approve the amount of compensation to be paid. Further, in other examples, the compensation confirmation request and the compensation confirmation are not used or are optional. Additionally, in some examples, the compensation confirmation request is sent if a risk analysis indicates that a payment amount can be fraudulent or otherwise incorrect.

In response to determining the amount of compensation to be paid to each employee and receiving the compensation confirmation, the payroll module 236 can determine a total payroll payment amount to send as a request for a transfer of funds from a bank associated with the employer 204 (e.g., employer bank), which can be associated with the employer bank computing device(s) 214, to a bank associated with the service provider (e.g., service provider bank), which can be associated with the one or more service provider bank computing device(s) 214. In at least one example, the service provider bank computing device(s) 214 can store information associated with a service provider account 242. In some examples, the total payroll payment amount can be the total amount of the payroll payments that will be paid for the current payroll period. In other examples, the total payroll payment amount can include the total amount of payroll payments for the current payroll period and the total amount of payroll payments for one or more previous payroll periods. For instance, the payroll service can pay the employee(s) 208 with a different frequency than the requests for the transfer of funds are submitted to the employer bank computing device(s) 214. As one example, at least some of the employee(s) 208 can be paid every day, but a request for transfer of a cumulative total amount of payroll payments might be sent only every week, every two weeks, or the like.

The payroll module 236 can send the total payroll payment amount to the employer bank computing device(s) 214 to request transfer of funds to the service provider bank. Additionally, in some examples, the total payroll payment amount can include an amount of tax withholdings that will be withheld from the payroll payments to be made to the employee(s) 208, and which will be used for a separate payment of taxes to one or more government entities on behalf of the employee(s) 208. In other examples, the payroll module 236 can send a separate request for a separate transfer of funds for the taxes to be paid on behalf of the employee(s) 208. For instance, the frequency with which the taxes are paid to the government can be different from the frequency with which the employee(s) 208 are paid, and can also be different from the frequency with which funds are requested to be transferred to reimburse the service provider for the payroll payments made to the employee(s) 208.

In response to receiving the request for transfer of the total payroll payment amount, the employer bank computing device(s) 214 can facilitate the transfer of the total amount of the payroll payments to the service provider bank. For example, the employer bank can transfer funds to the service provider bank, via the respective computing device(s), using any suitable money transferring technique, and typically can use a batch-processed transfer of funds. As one example, in the United States, bank-to-bank transfers of funds can be made using a batch fund transfer technique referred to as an ACH (automated clearing house) payment. For example, ACH payments employ a convention adopted by the United States banking industry that includes an electronic network for financial transactions in the United States. ACH includes processing of large volumes of credit and debit transactions in batches. Both the US government and the commercial financial sectors use ACH payments. Rules and regulations that govern the ACH network are established by NACHA (National Automated Clearing House Association) and the Federal Reserve. Further, in other countries, similar batch fund transfer techniques can be employed.

The employer banking computing device(s) 214 can facilitate a batch fund transfer to transfer the total payroll payment amount to the service provider bank. In some examples, the service provider bank computing device(s) 240 can receive a notification, or other indication, associated with the batch fund transfer, e.g., indicating that the batch fund transfer is complete. In addition, the service provider bank computing device(s) 240 can send a notification, or provide another indication, to the service computing device(s) 210 that the batch fund transfer is complete. As a result of the batch fund transfer, the employer bank computing device(s) 214 can deduct the total amount of payroll payments from the employer account 216 and add the total amount of payroll payments to the service provider account 242. Or, the employer bank computing device(s) 214 can deduct amounts of payroll payments from the service provider account 242 and, at a subsequent time, deduct the total amount of payroll payments from the employer account 216 and add the total amount of payroll payments to the service provider account 242.

As described above, in some examples, the payroll module 236 can make payroll payments to the respective employee(s) 208 prior to completion of the batch fund transfer from the employer bank to the service provider bank. For example, the payroll module 236 can send payroll payment information to the service provider bank computing device(s) 240 to instruct or otherwise request the service provider bank to send the payroll payments using a payment technique specified by at least one of the employer 204 or a respective employee, which can be sent prior to the batch fund transfer from the employer bank to the service provider bank. In other examples, the payroll module 236 can send payroll payment information to the service provider bank computing device(s) 240 at some time after the completion of the batch fund transfer from the employer bank to the service provider bank.

The payroll payment information can identify each employee that is to receive a payroll payment for the current payroll period and can specify the amount of funds to be paid to each employee. The payroll payment information can further specify how each employee is to be paid, such as by providing the employee's full name, employee's bank account information, the employee's mailing address and/or various other information about the employee and or the payroll payment to be made to the employee. As one example, the payroll payments can be made by near real-time direct funds transfer to a respective employee account 220 for each employee. As another example, a payroll payment can be made by a check, a debit card, or other payment instrument, that is mailed to a mailing address of the employee, or that is delivered to the workplace of the employee for distribution by the employer 204. As still another example, the payroll payment can be made by direct deposit using a batch fund transfer technique, such as an ACH payment.

In some implementations, the service provider can use a near real-time direct money transfer technique, rather than ACH or other batch processing techniques, for sending payroll payments to the employee account(s) 220. Accordingly, the employee(s) 208 are able to receive a payroll payment on the same day as the day on which the work was performed, or at some time earlier than payment would be made in a typical payment cycle. Thus, the service computing device(s) 210 can send an electronic communication that causes the payroll payments to be sent to respective employee account(s) 220 in near real-time, e.g., within a matter of seconds or minutes. For instance, notification of the payroll payment can be received by one or more employee bank computing device(s) 218. In some examples, the payroll payments can be sent via near real-time payment techniques that utilize debit card information associated with the respective employee account(s) 220. For example, debit card payments can be used to transfer the payroll payment for receipt in near real-time, e.g., generally within a matter of seconds. Contrasted with ACH or other batch-processed money transfer techniques, which can take several days, the payroll payment made using debit card information of an employee (or other account information enabling near real-time transfer of funds) enables the payroll payment to be received and accessed by the employee on the same day, same hour, and/or same minute as when the payroll payment is initiated by the payroll module 236 and/or the service provider bank. In some examples, the payroll module 236 can receive, on the same day, a confirmation communication that a payroll payment has been received or otherwise deposited into an employee account 220 of an employee.

The employee payroll information maintained for individual employee(s) can include a debit card number corresponding to an employee account 220 of the respective employee. The service provider bank computing device(s) 240 can be configured to communicate with the one or more computing devices (not shown in FIG. 1) of an interbank network (e.g., Pulse®, Cirrus®) which enable near real-time transfer of funds. For example, the interbank network can enable a single message format for fund transfers whereby the service provider bank computing device(s) 240 can communicate directly or indirectly with the employee bank computing device(s) 218 through the interbank network for sending the payroll payment to the employee bank in near real-time, e.g., often in less than one minute, and typically in a matter of several seconds.

As mentioned above, the payroll payments can be sent before the batch fund transfer has been completed and/or before the batch fund transfer has been requested. Accordingly, in some examples, the payroll payments can equate to a cash advance from the service provider to the employer 204 since the money for the payroll payments can be removed from a service provider account 240 at least several days before the batch fund transfer is received from an employer account 216. Thus, the service provider can be taking on some risk, such as that the employer 204 can go out of business before repaying the service provider, the employer 204 may not have sufficient funds to repay the service provider, an employee can have fraudulently claimed to work more hours than were actually worked, an employee can have fraudulently increased his or her compensation amount, and so forth. Consequently, in some examples, the service provider can perform a risk analysis prior to initiating sending of the payroll payments, as described above. Alternatively, in other examples, the service provider can collect funds in advance from the employer 204 that can be used, at least in part, to make the payroll payment.

In some examples, when determining whether to make a payroll payment based on a risk analysis, a risk module 244 can be executed by the service computing device(s) 210.

Accordingly, the risk module 244 can determine the total payroll payment amount, and can determine a risk associated with paying the one or more employee(s) 208 prior to receiving the batch fund transfer from the employer account 216. The risk module 244 can determine a likelihood that the employer 204 will be able to pay the payroll service provider for the payroll payment based on various factors determined about the employer 204 and/or the employer's business. For instance, the risk module 244 can access employer information that indicates a value (or predicted value) of business(es) of the employer 204, amounts (or predicted amounts) of funds in account(s) (e.g., employer account 216) of the employer 204, debits (or predicted debits) of the employer 204, a length of time business(es) of the employer 204 have been open for business, a chargeback history of the employer 204, a fraud history of the employer 204, feedback associated with the employer 204, inventory of the employer 204, etc.

In some examples, the risk module 244 can employ one or more statistical models and/or can apply one or more metrics to determine whether the employer 204 is likely to be able to pay for the payroll payments, and further, can apply one or more additional metrics to guard against the possibility of fraud by an employee or an otherwise incorrect payroll payment amount. Thus, the risk module 244 can determine, e.g., based on the one or more statistical models and/or the one or more metrics, whether the employer is likely to have sufficient funds to pay for the one or more payroll payments.

Examples of suitable metrics include at least one of: whether an amount of the one or more payroll payments exceeds a threshold amount (which can be indicative of fraud or an otherwise incorrect payment amount); whether the amount of sales of the employer over a recent period of time is substantially less than historical sales; whether the employer has a history of not repaying payroll advances; whether any money has been received in advance from the employer for payment of the payroll (e.g., from money withheld from sales revenue); whether money is available from current sales revenue and the payroll service is authorized to use this money; whether an amount of inventory that the employer has on hand is indicative that the employer is solvent within a threshold level; whether predicted gross margins of the employer are within an threshold range, as determined, e.g., based on prices that the employer charges for items, prices the employer pays for items, and labor costs of the employer. Further, the service provider can also take into consideration information regarding the employer's purchases as a customer when purchasing items from other merchants that use the payment service of the service provider. Several examples of suitable statistical models that can be used to predict whether payroll payments should be made in advance for a particular employer can include regression models, such as linear regression models, and stochastic models, such as Markov models, hidden Markov models, and so forth.

In some examples, the risk module 244 can utilize a data model trained via machine learning mechanisms, as described below. In such examples, the risk module 244 can output a level of risk, which can be compared to a threshold to determine whether instant deposits are permitted and/or an amount of funds that can be paid via instant deposits made on behalf of the employer 204. For instance, in at least one example, if the risk module 244 determines that the risk associated with an employer 204 is below a threshold level of risk, the payroll service can determine that the employer 204 is permitted to transfer at least a portion of payroll payment prior to completion of the batch fund transfer. Or, in at least one example, if the risk module 244 determines that the risk associated with an employer 204 meets or exceeds a threshold level of risk, the payroll service can await completion of the batch fund transfer prior to sending the payroll payments. Additionally and/or alternatively, the payroll module 236 can dynamically adjust an amount that the employer 204 is permitted to pay prior to completion of the batch fund transfer and/or via instant deposit based on how the level of risk compares to the threshold level of risk.

Additional details associated with enabling employers to provide instant deposits for their employees are described in U.S. patent application Ser. No. 14/334,488, filed on Jul. 17, 2014, the entire contents of which are incorporated herein by reference.

As described above, not all employees 208 may qualify for instant deposit and/or may not qualify to receive complete payroll payments via instant deposit. As described above, paying employees 208 outside of the typical payment cycle can reduce an employer's 204 cash flow and expose the employer 204 to risk. Accordingly, in at least one example, a reliability module 246 can analyze individual employees 208 to determine whether particular employees 208 are eligible for instant deposit and/or the amount of their payroll payments that they are able to receive via instant deposit. That is, in at least one example, the payroll module 236 can determine when to send an instruction to the service provider bank computing device(s) 240 to cause the service provider bank to make payroll payments to particular employee(s) 208 based at least in part on a reliability analysis of the particular employee(s) 208. In at least one example, the reliability module 246 can evaluate data stored in the employee profile(s) 248 to assess the reliability of the particular employee(s) 208.

Employee profile(s) 248 can store data associated with the employee(s) 208. In at least one example, an employee profile 248 of an employee can include employee payroll information 226, as described above. Additionally, an employee profile 248 can include to other types of information such as an address, phone number, email address, etc. of the employee. In at least one example, the employee profile 248 can include a frequency at which the employee desires to be paid, which can be determined by the employer 204 and/or the employee.

In some examples, an employee profile 248 can include employee information associated with the employee. Employee information can indicate historical employee information associated with the employee. For instance, the employee information can indicate previous employer(s) of the employee, previous work schedule(s) of the employee, previous earnings of the employee, previous payroll payments of the employee, previous attendance of the employee, previous hours worked by the employee, previous reviews of the employee, previous feedback of the employee, fraud reports associated with the employee, etc. Furthermore, the employee profile 248 can include current employee information that indicates a length of time the employee has worked for the current employer, current and/or future work schedule(s) of the employee, earnings associated with the employee for a current pay period, current attendance of the employee, a number of hours worked by the employee during a current pay period; recently received feedback associated with the employee, etc. In at least one example, the employee information can be determined based at least in part on transaction information (received from one or more employers) and/or payment processing data (associated with one or more employers).

In some examples, the service computing device(s) 210 can maintain the employee profile(s) 248 so that they can be managed by the respective employee(s) for maintaining and updating at least a portion of the employee payroll information 226, as described above. Accordingly, an employee can update the employee payroll information in the employee's own respective employee profile 248, such as by accessing the employee profile 248 through a browser or other application on an employee computing device 206, on the employer computing device(s) 202, or the like. The payroll module 236 can automatically apply any updates without any action on the part of the employer 204 to the employee payroll information 226 in the payroll information 224.

As a non-limiting example, suppose that an employee wishes to change the number of withholding exemptions in the employee's W-4 form. The employee does not have to ask the employer for access to the employee's information, but rather can access their employee profile 248 and make the desired changes to the withholding exemptions. Changes to other types of information such as an address, phone number, email address, etc., can be made in a similar manner.

Further, in some examples, the employee can change the employee's payroll payment frequency, if desired, such as by accessing the employee's own employee profile 248. For example, the payroll module 236 can schedule a next payroll payment to be made to the employee based, e.g., on a start date or last payroll payment date of the particular employee and an indicated payroll payment frequency. In some examples, the employee can initially have a default payroll payment frequency, e.g., daily, weekly, etc., and the employee can access the employee profile 248 to change the payroll payment frequency 236. Alternatively, in other examples, the employer 204 can control access to the employee payroll information 226, and the employer 204 can specify or change the payroll payment frequency for particular employee(s) based on requests from the particular employee(s). In such an example, the payroll information received by the payroll module 236 from the employer 204 can specify a payroll payment frequency indicating how frequently an individual employee is to be paid. Additional details associated with enabling employees to customize aspects of payroll frequency are described in U.S. Pat. No. 9,416,387, the entire contents of which are incorporated herein by reference.

As a non-limiting example, suppose that the employer 204 by default signs up new employee(s) to be paid on a weekly basis, such that a payroll payment is issued at the end of each week for the work performed that week. Furthermore, suppose that the employer 204 allows the employee(s) the option to select one or more alternative payroll payment frequencies, such as daily, every other day, every two weeks, monthly, etc. In addition, suppose that after several weeks of receiving a weekly payroll payment, a particular employee decides that she would prefer to be paid on a daily basis for the work performed the same day. In some examples, if she has not done so already, the particular employee can provide debit card information (e.g., a debit card number) for the corresponding employee bank account 220 to enable the payroll payments to be made directly to the employee bank account 220 in near real-time. Alternatively, if the employee does not desire to provide debit card information, the payroll payments can still be made on a daily basis, such as by check or by direct deposit to the employee account 220, e.g., using ACH payments, but receipt of these payroll payments by the employee can consequently be delayed by several days and will therefore not be received the same day or in otherwise near real-time.

As mentioned above, to change the payroll payment frequency, the particular employee can access the corresponding employee profile 248. For example, the employee can be able to access an employee dashboard or other user interface (not shown in FIG. 2) that allows the employee to select the payroll payment frequency, and that further allows the employee to enter debit card information for receiving the payroll payments in near real-time. Alternatively, e.g., if the service provider does not maintain employee profile(s) 248, the employer 204 can access the employee payroll information 226, such as using the UI 230, and can change the payroll payment frequency for the particular employee to the desired frequency. Further, if necessary, the employer 204 can enter the employee's debit card information at the same time. In response to receiving the update to the payroll payment frequency for the particular employee, the payroll module 236 can determine when the last payroll payment was provided to the particular employee and, based on this information, can determine when the next payroll payment is to be made. Thus, the payroll module 236 can begin making the payroll payments according to the specified payroll payment frequency for the particular employee.

As described above, in at least one example, the service provider can utilize a reliability analysis to determine whether an employee is eligible for instant deposit and/or an amount of payroll payment that the employee can collect via instant deposit. In at least one example, the reliability module 246 can access data associated with an employee profile 248 of an employee to determine a reliability of the employee.

In some examples, the reliability module 246 can employ one or more statistical models and/or can apply one or more metrics to determine whether the employee is reliable such that it is worth the risk to the employer 204 to provide the employee with access to instant deposits. Thus, the reliability module 246 can determine, e.g., based on the one or more statistical models and/or the one or more metrics, whether the employee is reliable and thus deserving of access to instant deposits.

Examples of suitable metrics include at least one of: whether an employee has had more than a threshold number of employers (which can be indicative of a lack of loyalty or unreliability); whether the length of time that the employee has been employed by the employer 204 meets or exceeds a threshold; whether the employee is scheduled to work at a future time; whether the employee has an attendance record that reflects that the employee is present for scheduled work above a threshold amount of time; whether the employee has a history of inaccurate reporting (which can be indicative of fraud or unreliability); whether the amount of sales of the employee over a recent period of time is substantially less than historical sales; etc. Several examples of suitable statistical models that can be used to predict whether payroll payments should be made in advance for a particular employer can include regression models, such as linear regression models, and stochastic models, such as Markov models, hidden Markov models, and so forth.

In some examples, the reliability module 246 can utilize a data model trained via machine learning mechanisms, as described below. In such examples, the data model can output a value indicative of the reliability of the employee, which can be compared to a threshold to determine whether the employee is eligible for instant deposits and/or an amount the employee can collect via an instant deposit. In at least one example, if the reliability module 246 determines that the value corresponding to the reliability of an employee is less than a threshold value, the payroll service can prohibit the employee from collecting payroll payments via instant deposits. In other examples, if the reliability module 246 determines that the reliability associated with an employee is less than a threshold value, the payroll service can dynamically adjust an amount that the employee is permitted to collect via instant deposit prior to a regularly scheduled payday.

In at least one example, if reliability module 246 determines a value corresponding to the reliability of an employee is greater than a threshold value, the reliability module 246 can cause the payroll module 236 to send a notification (e.g., a text message, an email, a push notification, etc.) to an employee computing device 206 operated by the employee to notify the employee that he or she is eligible for instant deposit. In at least one example, the notification can indicate whether the employee has provided employee payroll information 226 sufficient to enable the payroll module 236 to facilitate the instant deposit. If the employee has not yet provided such information, the notification may include a control to enable the employee to provide such information. In at least one example, the employee can interact with the employee computing device 206 to confirm that he or she desires to be paid via instant deposit. Responsive to receiving such a request, the payroll module 236 can facilitate payment via instant deposit, as described above. In other examples, if an employee is determined to be eligible for instant deposit, the payroll module 236 can instantly deposit funds in an account of the employee, without sending a notification and receiving a confirmation. That is, in some examples, the notification and/or confirmation may not be used or can be optional.

As described above, in at least one example, the service provider can provide a payment service that enables merchants to conduct POS transactions with customers who purchase items from the merchants. In some examples, as discussed additionally below, the payment service and the payroll service can be able to share information, e.g., information from the payment service can be used to determine at least a portion of compensation due to one or more employee(s) 208, such as for gratuities, commission, hourly wages, and the like. Further, information from the payment service can be used at least in part to determine a risk assumed by the service provider when making a payroll payment prior to receiving a batch fund transfer from the employer's 204 account.

In at least one example, the employer computing device(s) 202 can facilitate POS transactions between the employer 204 and one or more customers. In other examples, another device (not illustrated), which can be a different computing device, can facilitate POS transactions between the employer 204 and one or more customers. In at least one example, the employer computing device(s) 202 can include an instance of a merchant application 250 that is executed on the employer computing device(s) 202. The merchant application 250 can provide POS functionality to the employer computing device(s) 202 to enable the employer 204 to accept payments from one or more customers 208 at a POS location. For example, the employer 204 can use the employer computing device(s) 202 to accept payments through various different types of payment instruments, e.g., payment cards, electronic payment, cash or check, at the POS location from the one or more customers.

Regardless of the type of payment instrument used, the employer 204 and the customer(s) can conduct transaction(s) by which the customer(s) purchase item(s) from the employer 204 at the POS location. The merchant application 250 on the employer computing device(s) 202 can send transaction information to the service computing device(s) 210, e.g., while the transaction is being conducted at the POS location. In other examples, such as if the employer computing device(s) 202 are processing transactions offline, the transaction information can be sent in a batch at a subsequent point in time or using other suitable techniques.

In at least one example, the transaction information for a transaction can include an employee identifier associated with the particular employee that is conducting the transaction. For example, the employee can login to the employer computing device(s) 202 using a pin, a login ID, biometric information, or the like, to provide an indication that the particular transaction is being conducted by the particular employee. In some examples, multiple employee(s) 208 can share employer computing device(s) 202 and can enter a pin, biometric information, or other identifier before each transaction to indicate which employee should receive credit for conducting the particular transaction. The transaction information can further include an amount of the transaction, such as a total amount, amount per item, etc., and can further include a gratuity amount associated with the transaction if any.

The transaction information can include other information such as regarding the time and place of the transaction, information related to the item(s) acquired, a type of payment being used (e.g., cash, check, payment card, electronic payment), as well as additional information, such as customer identifying information. For instance, if a payment card, such as a credit card, debit card, charge card, prepaid card, or the like, is used as a payment instrument, the transaction information can include data stored in the payment card, e.g., Track 1 data (cardholder name, card number and other card information). In addition, when completing the transaction, a customer can sometimes provide an email address for receiving a receipt through email, a phone number for receiving a receipt via text message, or the like. Additional examples of other transaction information that can be captured include detailed item information, e.g., descriptors of the items (size, flavor, color, model, etc.), geolocation data indicating a geographic POS location of a particular transaction, online/offline card data, data describing the employer 204 and/or the employer computing device(s) 202, e.g., a merchant identifier, a merchant category code (MCC), or the like.

A payment service module 252 on the service computing device(s) 210 can receive the transaction information and can associate the transaction information with employer profile(s) 238 maintained by the service computing device(s) 210. In at least one example, a first employer profile 254 can correspond to the employer 204. The employer profile(s) 238 can include one or more additional profile(s) 256, which can store the same information as the first employer profile 254, or different information than the first employer profile 254.

In at least one example, if the customer is using a payment instrument, such as a payment card or an electronic payment account, that requires authorization, the payment service module 252 (or, alternatively, the service provider bank) can determine whether the payment instrument is authorized to be used to pay for the transaction. As one example, at least a portion of the transaction information (e.g., card information and transaction amount) can be routed by the payment service module 252 (or by the service provider bank) through an appropriate card network (e.g., a payment clearing house network) to the cardholder's issuing bank (not shown in FIG. 2). The cardholder's issuing bank responds by approving or declining the transaction, such as after checking that the card information is valid, there is sufficient credit in the cardholder's account, etc. The issuing bank sends a response code back through the card network to the payment service module 252 (or the service provider bank). If the payment instrument is authorized, the payment service module 252 (or the service provider bank computing device(s) 240) can send the response code with a payment authorization to the employer computing device(s) 202 to indicate to the employer 204 that payment using the payment instrument has been approved. The employer computing device(s) 202 and/or the service provider can store the response code for future use during settlement of the transaction amount as discussed additionally below. Alternatively, if the issuing bank does not authorize the transaction, then the payment service module 252 (or the service provider bank) can send back a message (not shown in FIG. 2) that includes a code indicating that the payment instrument is not authorized. In this situation, the customer may need to provide a different form of payment.

In at least one example, at least a portion of the transaction information can be associated with an employer profile corresponding to the particular employer 204. For example, the transaction information and other information received from the employer computing device(s) 202 can be used to determine employee time, employee sales, and/or employee gratuities. Thus, when an employee arrives at work, the employee can login to the employer computing device(s) 202, which can serve the same purpose as punching a time clock, and this login information can be sent to the service computing device(s) 210. Similarly, when the employee leaves for the day, the employee can logout of the employer computing device(s) 202, and this logout information can also be sent to the service computing device(s) 210. Accordingly, the service computing device(s) 210 can store employee time information 258 in the first employer profile 254 corresponding to the particular employer 204. The payroll module 236 can use the employee time information 258 to determine payroll payments for individual employee(s) of the employer 204, such as based on an amount of time worked by each employee.

Additionally, the service computing device(s) 210 can determine employee sales information 260 from the transaction information. For example, if an employee works for a commission, such as a percentage of gross sales, the employee sales information 260 can include the aggregated sales (e.g., amounts of transactions) associated with each employee ID per period of time, such as over the past day, past week, past month, etc. Further, in a situation in which multiple employee(s) 208 share a register, each employee can enter a pin before registering one or more sales. The payroll module 236 can determine payroll payments to be made to individual employee(s) based on one or more payroll rules established by the employer 204, such as the employee is paid an hourly wage plus 10% of gross sales, or other suitable payroll rule. As an example, if the employee has elected to be paid at the end of each day, the payroll module 236 can determine the employee's sales commission on a daily basis, e.g., after the employee logs out for the day, and can send a payroll payment to the employee's account to pay the employee on the same day as the day on which the work was performed using near real-time payment techniques.

Further, if the employee works in an industry in which tipping is customary, then employee gratuity information 262 can be determined. For example, if the employee works for gratuities as a part of the employee's compensation, the payroll module 236 can determine the gratuity amounts received in association with each employee ID per pay period, such as over the past day, past week, past month, etc., and the payroll module 236 can determine payroll payments to be made to the employee based on one or more payroll rules established by the employer 204, such as the employee gets paid 80% of gross gratuities, with the other 20% going to other employee(s), or other suitable payroll rule.

Further, the first employer profile 254 can include employer information 264, which can include payroll-related information about the employer 204, such as the employer's tax identification number, the employer's bank account information, and so forth. In addition, the first employer profile 254 can include the payroll information 224, as discussed above. The payroll information can include the employee payroll information 226 and the compensation information 228, which can be included for each employee, and which can be added to the payroll information for the particular employer. Examples of the employee payroll information 226 can include the employee's full name, mailing address, telephone number, email address, taxpayer identifier, date of birth, federal withholding information (e.g., a filled-out IRS Form W-4), state withholding information, employment eligibility information (e.g., completed US Customs and Immigration Service Form I-9), bank account information for receiving payroll payments, and so forth, as described above.

In some examples, the information associated with the employer profile(s) 238 (e.g., employee time information 258, employee sales information 260, employee gratuity information 262, etc.) can be aggregated, processed, and parsed by individual employees. In such examples, data particular to an employee can be stored in a corresponding employee profile 248.

During business operation, e.g., on a daily basis, as the employer computing device(s) 202 sends transaction information to the payment service module 252 for a plurality of transactions, the payment service module 252 can construct a log of all the transactions for the employer 204. Thus, the service provider 102 can receive an indication of an amount of funds that will be received for payments made in association with one or more transactions conducted by the employer 204. As mentioned above, in the example that customers use payment cards or electronic accounts for making payments to the employer 204, the service provider bank can act as an acquiring bank for the payments, and the log can include the authorization codes received from issuing banks for respective authorized transactions, as mentioned above. Thus, at the end of each day, the payment service module 252 can provide the authorized transactions to the service provider bank, and the service provider bank can transmit the authorizations to the appropriate card network. The card association (e.g., Visa®, MasterCard®, etc.) debits an account of the issuing bank and credits an account of the acquiring bank, i.e., the service provider bank. Further, the service provider bank credits the service provider's account 242 in the amount of the authorized transactions.

Additionally, the payment service module 252 can total the sales receipts of all of the transactions for the particular employer 204 to determine a total sales revenue after taxes and payment processing fees are deducted. For instance, the payment service module 252 can deduct a first percentage from the daily sales revenue as a payment processing service fee. In addition, with authorization from the employer 204, the payroll service can further deduct, as withheld funds, a specified percentage from the daily sales revenue to be used for payroll payments, such as for future payroll payments, or as repayment for payroll payments already made. The payment service module 252 can then transfer the remainder of the sales revenue to the employer bank account 216 as remaining funds, such as via an ACH batch fund transfer. Accordingly, using this technique, the payroll service can receive at least some money for paying the payroll payments in advance, or at least sooner than would be the possible with an ACH fund transfer. Further, in the example that the service provider withholds money in advance, the service provider can save the withheld funds to the service provider account 242 and can offer interest to the employer 204, or other incentives, to encourage the employer to participate in the withholding of money to be used to pay the payroll payments.

Figure 3:
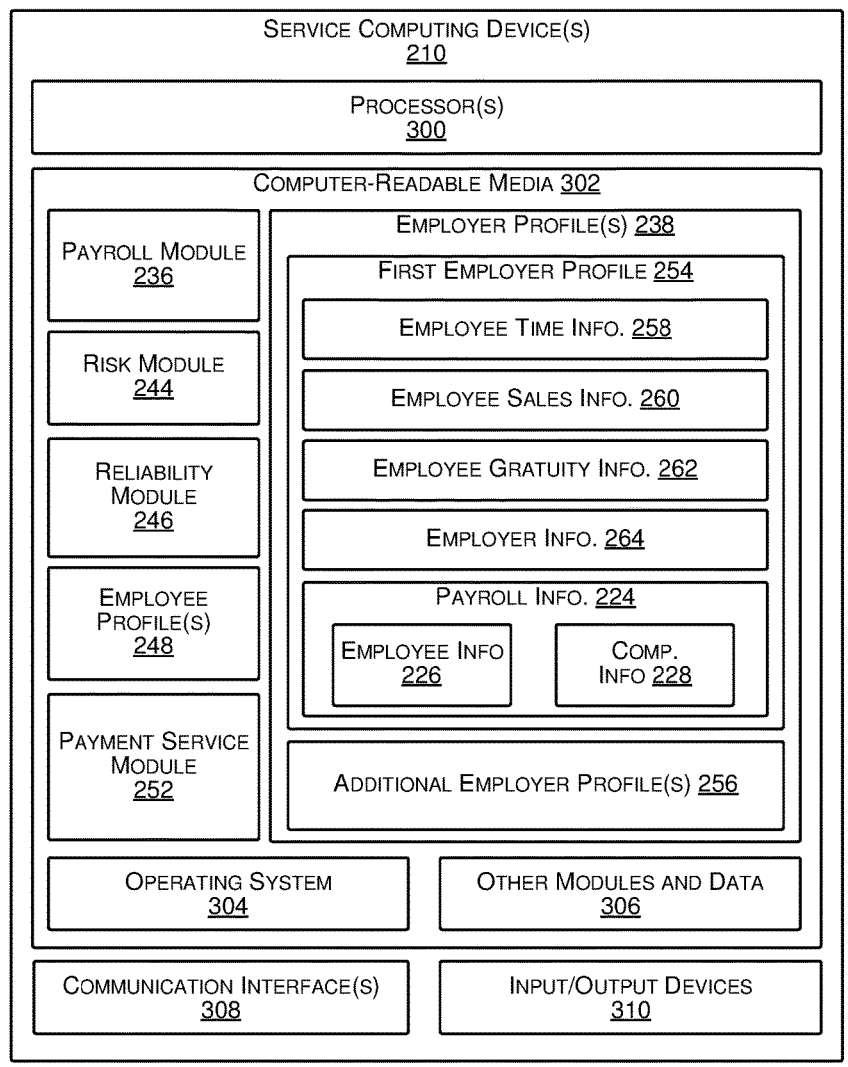
FIG. 3 illustrates select components of one or more example service computing devices according to some implementations.

FIG. 3 illustrates select components of one or more example service computing devices 210 according to some implementations. The service computing device(s) 210 can be operated by a service provider that provides the payroll service, and can include one or more servers or other types of computing devices that can be embodied in any number of ways. For example, in the example of a server, the modules, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the service computing device(s) 210 as being present in a single location, these components and data can alternatively be distributed across different computing devices and different locations in any manner Consequently, the functions can be implemented by one or more service computing devices, with the various functionality described above distributed in various ways across the different computing devices. Multiple service computing device(s) 210 can be located together or separately, and organized, for example, as virtual servers, server banks and/or server farms. The described functionality can be provided by the servers of a single entity or enterprise, or can be provided by the servers and/or services of multiple different customers or enterprises.

In the illustrated example, the service computing device(s) 210 can include one or more processors 300, one or more computer-readable media 302, and one or more communication interfaces 300. Each processor 300 can be a single processing unit or a number of processing units, and can include single or multiple computing units or multiple processing cores. The processor(s) 300 can be implemented as one or more microprocessors, microcomputers, microcontrollers, digital signal processors, central processing units, state machines, logic circuitries, and/or any devices that manipulate signals based on operational instructions. For example, the processor(s) 300 can be one or more hardware processors and/or logic circuits of any suitable type specifically programmed or configured to execute the algorithms and processes described herein. The processor(s) 300 can be configured to fetch and execute computer-readable instructions stored in the computer-readable media 302, which can program the processor(s) 300 to perform the functions described herein.

The computer-readable media 302 can include volatile and nonvolatile memory and/or removable and non-removable media implemented in any type of technology for storage of information, such as computer-readable instructions, data structures, program modules, or other data. Such computer-readable media 302 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing device(s) 210, the computer-readable media 302 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 302 can be used to store any number of functional components that are executable by the processors 300. In many implementations, these functional components comprise instructions or programs that are executable by the processors 300 and that, when executed, specifically configure the one or more processors 300 to perform the actions attributed above to the service computing device 104. Functional components stored in the computer-readable media 302 can include the payroll module 236, the risk module 244, the reliability module 246, and the payroll service module 252. Additional functional components stored in the computer-readable media 302 can include an operating system 304 for controlling and managing various functions of the service computing device(s) 210.

In at least one example, the computer-readable media 302 can include or maintain other functional components and data, such as other modules and data 306, which can include programs, drivers, etc., and the data used or generated by the functional components. Further, the service computing device 104 can include many other logical, programmatic and physical components, of which those described above are merely examples that are related to the discussion herein.

In at least one example, one of the other modules and data 306 can include a training module for leveraging machine learning mechanisms to train data model(s). In an example, the training module can train a data model for determining one or more levels indicative of the risk associated with an employer 204. In an additional example, the training module can train a data model for determining one or more values indicative of a reliability of an employee. Furthermore, in an additional and/or alternative example, the training module can train a data model for determining a percentage of a total amount of compensation to pay to an employee. In at least one example, the training module may utilize a machine learning mechanism to build, modify, or otherwise utilize data model(s) that are created from example inputs and makes predictions or decisions. In such an example, the data model(s) may be trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc. Additional details associated with training the relevant data model(s) are described below with reference to FIGS. 5-7.

In addition, the computer-readable media 302 can store data used for performing the operations described herein. Thus, the computer-readable media can store the employer profile(s) 238, including the employee time information 258, employee sales information 260, employee gratuity information 262, employer information 264, employee profile(s) 248, and payroll information 224. As described above, the payroll information 224 can include the employee payroll information 226 and compensation information 228.

The communication interface(s) 308 can include one or more interfaces and hardware components for enabling communication with various other devices, such as over the network(s) 212. For example, communication interface(s) 308 can enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

The service computing device 210 can further be equipped with various input/output (I/O) devices 310. Such I/O devices 310 can include a display, various user interface controls (e.g., buttons, joystick, keyboard, mouse, touch screen, etc.), audio speakers, connection ports and so forth.

Figure 4:
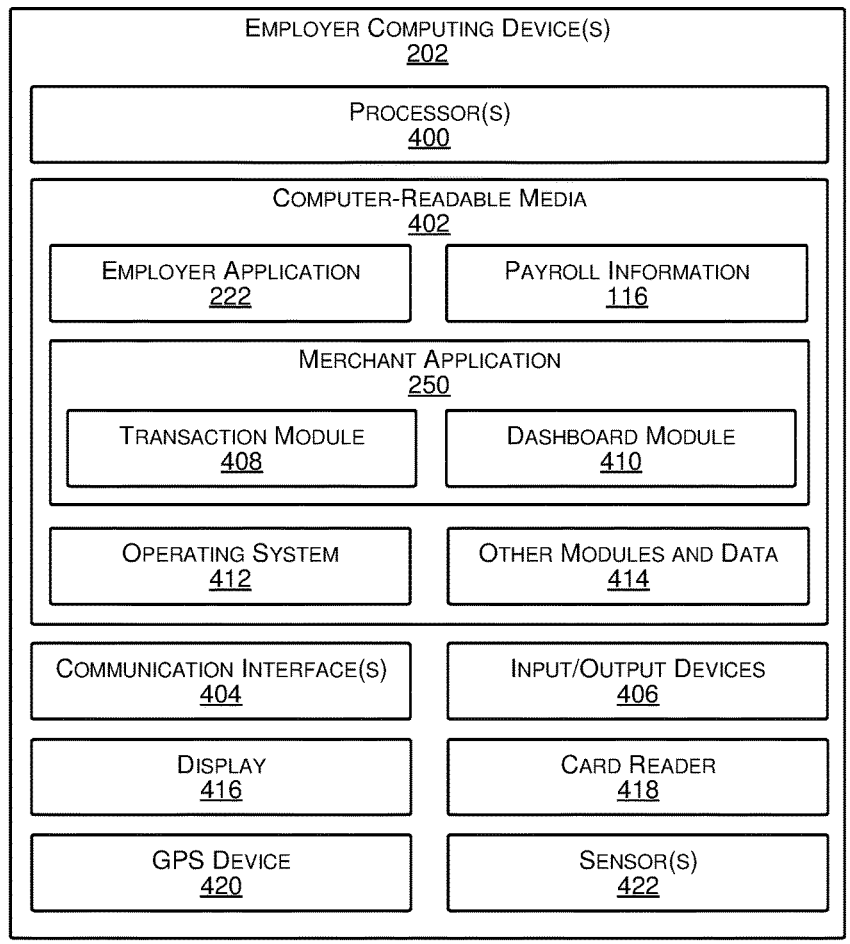
FIG. 4 illustrates select components of an example employer computing device according to some implementations.

FIG. 4 illustrates select example components of example employer computing device(s) 202, as described above. The employer computing device(s) 202 can be any suitable type of computing device, e.g., portable, semi-portable, semi-stationary, or stationary. Some examples of the employer computing device(s) 202 can include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; augmented reality devices; or other computing devices capable of sending communications and performing the functions according to the techniques described herein.

In the illustrated example, the employer computing device(s) 202 include one or more processors 400, one or more computer-readable media 402, one or more communication interfaces 404, and one or more input/output (I/O) devices 406. Each processor 400 can itself comprise one or more processors or processing cores. For example, the processor(s) 400 can be implemented as one or more microprocessors, microcomputers, microcontrollers, digital signal processors, central processing units, state machines, logic circuitries, and/or any devices that manipulate signals based on operational instructions. In some examples, the processor(s) 400 can be one or more hardware processors and/or logic circuits of any suitable type specifically programmed or configured to execute the algorithms and processes described herein. The processor(s) 400 can be configured to fetch and execute computer-readable processor-executable instructions stored in the computer-readable media 402.

Depending on the configuration of the employer computing device(s) 202, the computer-readable media 402 can be an example of tangible non-transitory computer storage media and can include volatile and nonvolatile memory and/or removable and non-removable media implemented in any type of technology for storage of information such as computer-readable processor-executable instructions, data structures, program modules or other data. The computer-readable media 402 can include, but is not limited to, RAM, ROM, EEPROM, flash memory, solid-state storage, magnetic disk storage, optical storage, and/or other computer-readable media technology. Further, in some examples, the employer computing device(s) 202 can access external storage, such as RAID storage systems, storage arrays, network attached storage, storage area networks, cloud storage, or any other medium that can be used to store information and that can be accessed by the processor(s) 400 directly or through another computing device or network. Accordingly, the computer-readable media 402 can be computer storage media able to store instructions, modules or components that can be executed by the processor(s) 400. Further, when mentioned, non-transitory computer-readable media exclude media such as energy, carrier signals, electromagnetic waves, and signals per se.

The computer-readable media 402 can be used to store and maintain any number of functional components that are executable by the processor(s) 400. In some implementations, these functional components comprise instructions or programs that are executable by the processor(s) 400 and that, when executed, implement operational logic for performing the actions and services attributed above to the employer computing device(s) 202. Functional components stored in the computer-readable media 402 can include the employer application 222. In addition, in some examples, the employer computing device(s) 202 can include the merchant application 250, which includes a transaction module 408 and a dashboard module 410. For example, the transaction module 408 can present various user interfaces to enable the employer 204 to conduct transactions, receive payments, and so forth. Further, the dashboard module 410 can enable the employer to manage the employer account and the like. Additional functional components can include an operating system 412 for controlling and managing various functions of the employer computing device(s) 202 and for enabling basic user interactions.

In addition, the computer-readable media 402 can also store data, data structures and the like, that are used by the functional components. For example, data stored by the computer-readable media 402 can include payroll information 224 such as a list of employee(s) on the payroll of the employer and other information about the employee(s), as well as compensation information.

Depending on the type of the employer computing device(s) 202, the computer-readable media 402 can also optionally include other functional components and data, such as other modules and data 414, which can include programs, drivers, etc., and the data used or generated by the functional components. Further, the employer computing device(s) 202 can include many other logical, programmatic and physical components, of which those described are merely examples that are related to the discussion herein.

The communication interface(s) 404 can include one or more interfaces and hardware components for enabling communication with various other devices, such as over the network(s) 212 or directly. For example, communication interface(s) 404 can enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

FIG. 4 further illustrates that the employer computing device(s) 202 can include a display 416. Depending on the type of computing device(s) used as the employer computing device(s) 202, the display 416 can employ any suitable display technology. For example, the display 416 can be a liquid crystal display, a plasma display, a light emitting diode display, an OLED (organic light-emitting diode) display, an electronic paper display, or any other suitable type of display able to present digital content thereon. In some examples, the display 416 can have a touch sensor associated with the display 416 to provide a touchscreen display configured to receive touch inputs for enabling interaction with a graphic interface presented on the display 416. Accordingly, implementations herein are not limited to any particular display technology. Alternatively, in some examples, the employer computing device(s) 202 may not include the display 416, and information can be presented by other means, such as aurally.

The employer computing device(s) 202 can further include the one or more I/O devices 406. The I/O devices 406 can include speakers, a microphone, a camera, and various user controls (e.g., buttons, a joystick, a keyboard, a keypad, etc.), a haptic output device, and so forth.

In addition, the employer computing device(s) 202 can include or can be connectable to a card reader 418. In some examples, the card reader 418 can plug in to a port in the employer computing device(s) 202, such as a microphone/headphone port, a data port, or other suitable port. The card reader 418 can include a read head for reading a magnetic strip of a payment card, and further can include encryption technology for encrypting the information read from the magnetic strip. Alternatively, numerous other types of card readers can be employed with the employer computing device(s) 202 herein, depending on the type and configuration of the employer computing device(s) 202.

Other components included in the employer computing device(s) 202 can include a GPS device 420 able to indicate location information. Further, the employer computing device(s) 202 can include one or more sensors 422, such as an accelerometer, gyroscope, compass, proximity sensor, camera, microphone, and/or a switch, as discussed above. Additionally, the employer computing device(s) 202 can include various other components that are not shown, examples of which include removable storage, a power source, such as a battery and power control unit, a barcode scanner, a printer, a cash drawer, and so forth. Further, the employee computing device(s) 206 can have a hardware configuration similar to the employer computing device, but can include different functional components, as discussed herein.

FIGS. 5-12 are flow diagrams illustrating example processes according to some implementations. The processes of FIGS. 5-12 are illustrated as collections of blocks in logical flow diagrams, which represent a sequence of operations, some or all of which can be implemented in hardware, software or a combination thereof. In the context of software, the blocks can represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. Further, in some examples, some or all of the operations illustrated in one or more of FIGS. 5-12 can be combined with some or all of the operations illustrated in others of FIGS. 5-12. For discussion purposes, the processes are described with reference to the environments, architectures and devices described in the examples herein, although the processes can be implemented in a wide variety of other environments, architectures and devices.

Various instructions, methods and techniques described herein can be considered in the general context of computer-executable instructions, such as program modules stored on computer-readable media, and executed by the processor(s) herein. Generally, program modules include routines, programs, objects, components, data structures, etc., for performing particular tasks or implementing particular abstract data types. These program modules, and the like, can be executed as native code or can be downloaded and executed, such as in a virtual machine or other just-in-time compilation execution environment. Typically, the functionality of the program modules can be combined or distributed as desired in various implementations. An implementation of these modules and techniques can be stored on computer storage media or transmitted across some form of communication media.

Figure 5:
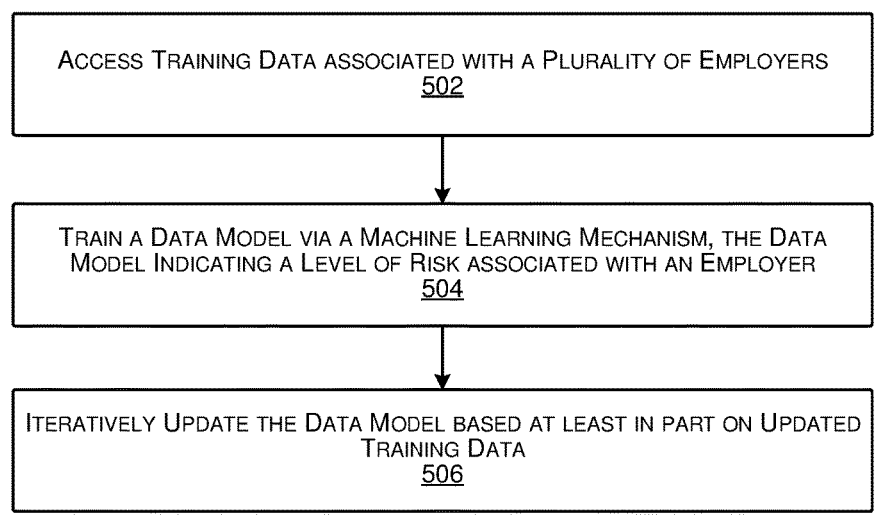
FIG. 5 is a flow diagram illustrating an example process for training a data model to determine a level of risk associated with an employer according to some implementations.

FIG. 5 is a flow diagram illustrating an example process 500 for training a data model to determine a level of risk associated with an employer. FIG. 5 is described in the context of the environment and/or device(s) described above with reference to FIGS. 2-4, but is not limited to such environment and/or device(s).

Block 502 illustrates accessing training data associated with a plurality of employers. As described above, one of the other modules and data 306 can include a training module for leveraging machine learning mechanisms to train data model(s). In an example, a training data item can include employer information associated with an employer (e.g., employer 204). The employer information associated with an employer, as described above, can indicate a value (or predicted value) of business(es) of the employer, amounts (or predicted amounts) of funds in account(s) (e.g., employer account 216) of the employer, debits (or predicted debits) of the employer, a length of time business(es) of the employer have been open for business, a chargeback history of the employer, a fraud history of the employer, feedback associated with the employer, inventory of the employer, etc. Additionally, a training data item can include repayment information indicative of whether the employer has fully compensated the service provider after the service provider has provided an advance of funds to the employer for payroll payments or for other use(s). In some examples, a training data item can be associated with a level of risk, which can be provided by a human analyst, for example.

Block 504 illustrates training a data model via a machine learning mechanism, the data model indicating a level of risk associated with an employer. The training module can train a data model based on a plurality of training data items such that, given a new input of employer information associated with an employer, the data model can output a level of risk indicating a likelihood that the employer will repay the service provider if the service provider advances funds on behalf of the employer. In at least one example, the training module can utilize a machine learning mechanism to train the data model. In such an example, the data model can be trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.

In some examples, the level of risk can be represented by a value. For instance, as a non-limiting example, an employer that is not likely to repay the service provider after the service provider advances funds to the employer (e.g., due to frequent chargeback requests and/or low balance(s) in account(s) of the employer, etc.) can be associated with a value near zero. Or, as another non-limiting example, an employer that is likely to repay the service provider after the service provider advances funds to the employer (e.g., due to infrequent chargeback requests and/or large balance(s) in account(s) of the employer) can be associated with a value near one. While zero and one are used as the minimum and maximum values, respectively, any values can be defined as the minimum and maximum values. Furthermore, indicators other than numbers can be used to represent a level of risk associated with an employer.

Block 506 illustrates iteratively updating the data model based at least in part on updated training data. In at least one example, the training module can receive updated training data. For instance, the training module can receive updated training data after a lapse of a predetermined period of time, at a particular frequency, etc. The updated training data can include updated employer information and updated repayment information. In at least one example, the training module can receive updated training data and can re-train the data model based at least partly on the updated training data.

Figure 6:
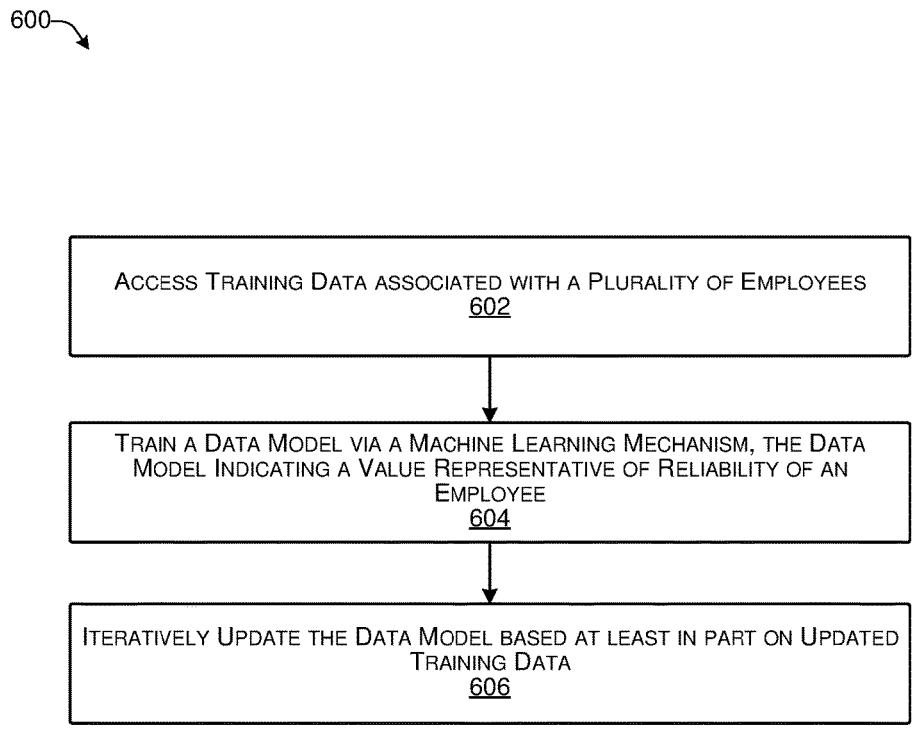
FIG. 6 is a flow diagram illustrating an example process for training a data model to determine value representative of reliability of an employee according to some implementations.

FIG. 6 is a flow diagram illustrating an example process 600 for training a data model to determine value representative of reliability of an employee. FIG. 6 is described in the context of the environment and/or device(s) described above with reference to FIGS. 2-4, but is not limited to such environment and/or device(s).

Block 602 illustrates accessing training data associated with a plurality of employees. As described above, one of the other modules and data 306 can include a training module for leveraging machine learning mechanisms to train data model(s). In an example, a training data item can include employee information and/or employee payroll information associated with an employee.

As described above, employee information can indicate historical employee information associated with an employee (e.g., employer(s) of the employee, previous work schedule(s) of the employee, previous earnings of the employee, previous payroll payments of the employee, previous attendance of the employee, previous hours worked by the employee, previous reviews of the employee, previous feedback of the employee, fraud reports associated with the employee, etc.) and/or current employee information associated with the employee (e.g., a length of time the employee has worked for the current employer, current and/or future work schedule(s) of the employee, earnings associated with the employee for a current pay period, current attendance of the employee, a number of hours worked by the employee during a current pay period; recently received feedback associated with the employee, etc.).

In some examples, a training data item can be associated with a value indicative of reliability, which can be provided by a human analyst, for example.

Block 604 illustrates training a data model via a machine learning mechanism, the data model indicating a value representative of reliability of an employee. The training module can train a data model based on a plurality of training data items such that, given a new input of employee information and/or employee payroll information associated with an employee, the data model can output a value representative of the reliability of the employee. In at least one example, the training module can utilize a machine learning mechanism to train the data model. In such an example, the data model can be trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.

As described above, the reliability of an employee can be represented by a value. For instance, as a non-limiting example, an employee determined to have a great work history with an employer (and/or other employers) (e.g., based on attendance, length of employment, etc.), who is scheduled to work 40 hours in an upcoming week, and no history of fraud can be associated with a value near one, indicating that the employee is a reliable employee. Or, as a non-limiting example, an employee determined to have an inconsistent work history with an employer (and/or other employers) (e.g., based on attendance, length of employment, etc.), who is scheduled to work 5 hours in an upcoming week, and poor reviews can be associated with a value near zero, indicating that the employee is not a reliable employee. While zero and one are used as the minimum and maximum values, respectively, any values can be defined as the minimum and maximum values. Furthermore, indicators other than numbers can be used to represent a level of risk associated with an employer.

Block 606 illustrates iteratively updating the data model based at least in part on updated training data. In at least one example, the training module can receive updated training data. For instance, the training module can receive updated training data after a lapse of a predetermined period of time, at a particular frequency, etc. The updated training data can include updated employee information. In at least one example, training module can receive updated training data and can re-train the data model based at least partly on the updated training data.

Figure 7:
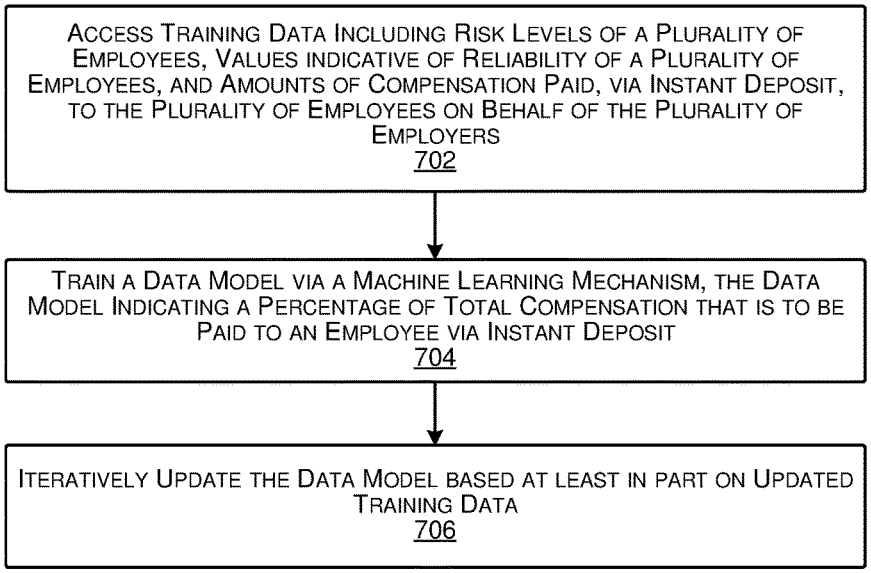
FIG. 7 is a flow diagram illustrating an example process for training a data model to determine an appropriate portion of compensation that can be paid via instant deposit according to some implementations.

FIG. 7 is a flow diagram illustrating an example process 700 training a data model to determine an appropriate portion of compensation that can be paid via instant deposit. FIG. 7 is described in the context of the environment and/or device(s) described above with reference to FIGS. 2-4, but is not limited to such environment and/or device(s).

Block 702 illustrates accessing training data including risk levels of a plurality of employers, values indicative of reliability of a plurality of employees, and amounts of compensation paid, via instant deposit, to the plurality of employees on behalf of the plurality of employers. As described above, one of the other modules and data 306 can include a training module for leveraging machine learning mechanisms to train data model(s). In an example, a training data item can include a risk level of an employer, a value indicative or reliability of an employee, and an amount of compensation paid, via instant deposit, to the employee on behalf of the employer. The training module can compare the amount paid with the total amount of compensation owed to an employee to determine a portion of the total amount owed to the employee that was paid to the employee via instant deposit.

Block 704 illustrates training a data model via a machine learning mechanism, the data model indicating a percentage of total compensation that is to be paid to an employee via instant deposit. The training module can train a data model based on a plurality of training data items such that, given a new input of a value of reliability associated with an employee and/or a level of risk of an employer, the data model can output an appropriate percentage of total compensation that is to be paid to an employee via instant deposit. In at least one example, the training module can utilize a machine learning mechanism to train the data model. In such an example, the data model can be trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.

As a non-limiting example, in an example where an employee has worked for the employer for five years, has sales exceeding a threshold, and is scheduled to work 40 hours in an upcoming week, and the employer has been in business for 10 years and has no history of fraud, the data model can output a percentage such that the employee is to be paid a total amount (e.g., 100%) of the compensation owed to the employee via instant deposit. However, in an example where an employee is a new employee and has worked for the employer for five days and is scheduled to work 10 hours in an upcoming week, and the employer has been in business for 10 years and has no history of fraud, the data model can output a percentage such that the employee is to be paid less than a total amount (e.g., 60%) of the compensation owed to the employee via instant deposit. In an alternative example where an employee has worked for the employer for five years, has sales exceeding a threshold, and is scheduled to work 40 hours in an upcoming week, and the employer has been in business for less than one year and has a history of chargebacks, the data model can output a percentage such that the employee is to be paid less than a total amount (e.g., 40%) of the compensation owed to the employee via instant deposit.

Block 706 illustrates iteratively updating the data model based at least in part on updated training data. In at least one example, the training module can receive updated training data. For instance, the training module can receive updated training data after a lapse of a predetermined period of time, at a particular frequency, etc. The updated training data can include updated risk and/or reliability information, or updated payment information. In at least one example, the training module can receive updated training data and can re-train the data model based at least partly on the updated training data.

While FIG. 7 is described above with reference to training a data model based on a determined level of risk and a determined value indicative of reliability, in some examples, the data model can be trained based on the information input into the risk data model (described above with reference to FIG. 5) and/or the information input into the reliability data model (described above with reference to FIG. 6). In such examples, the employer information, employee payroll information, and/or employee information can be utilized to train a data model for risk assessment in order to output an appropriate percentage of total compensation that is to be paid to an employee via instant deposit.

Figure 8:
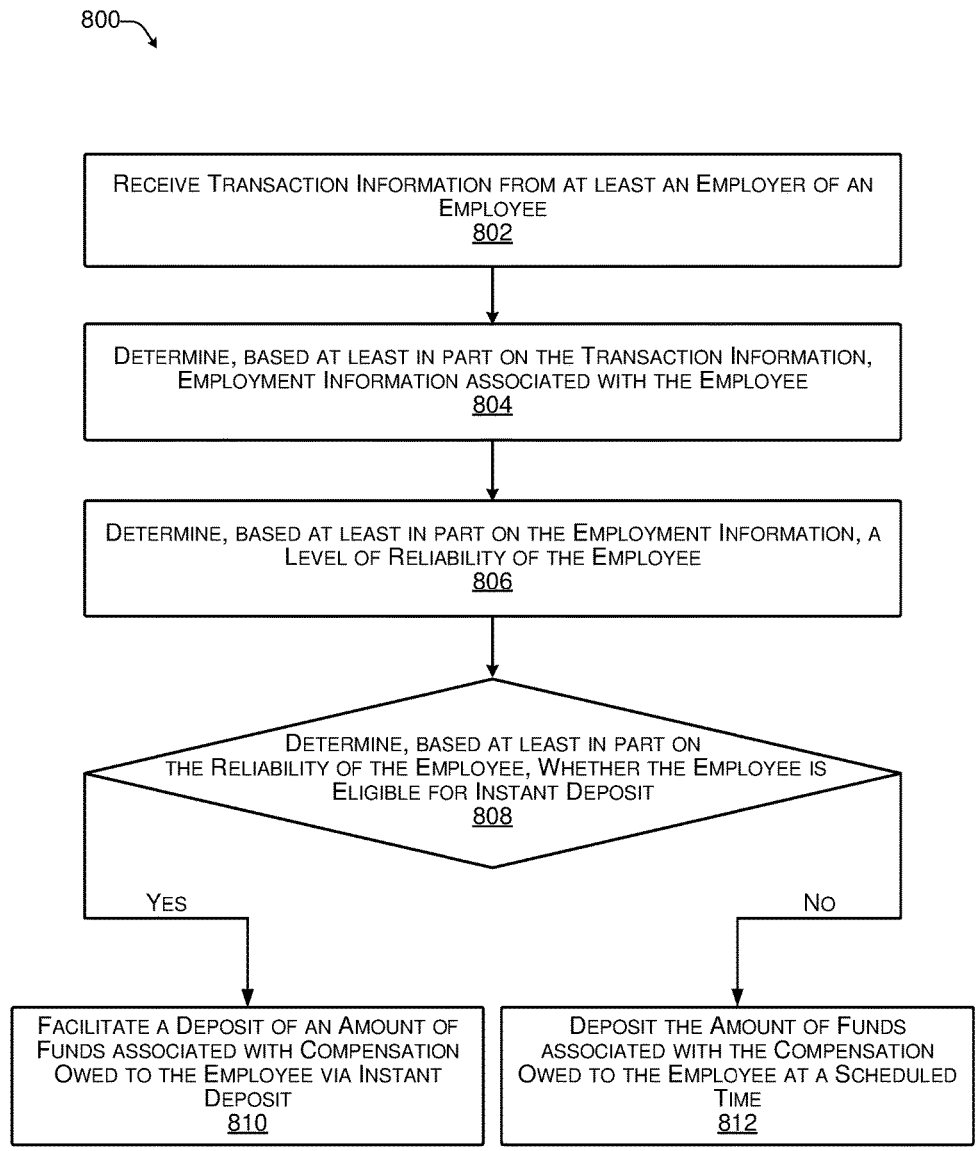
FIG. 8 is a flow diagram illustrating an example process for determining whether an employee is eligible for instant deposit and processing a payroll payment based on such determination according to some implementations.

FIG. 8 is a flow diagram illustrating an example process 800 for determining whether an employee is eligible for instant deposit and processing a payroll payment based on such determination. FIG. 8 is described in the context of the environment and/or device(s) described above with reference to FIGS. 2-4, but is not limited to such environment and/or device(s).

Block 802 illustrates receiving transaction information from at least an employer of an employee. As described above, the employer computing device(s) 202 can facilitate POS transactions between the employer 204 and one or more customers. In at least one example, the merchant application 250 on the employer computing device(s) 202 can send transaction information to the service computing device(s) 210, e.g., while the transaction is being conducted at the POS location. In other examples, such as if the employer computing device(s) 202 are processing transactions offline, the transaction information can be sent in a batch at a subsequent point in time or using other suitable techniques.

In at least one example, the transaction information for a transaction can include an employee identifier associated with the particular employee that is conducting the transaction. For example, the employee can login to the employer computing device(s) 202 using a pin, a login ID, biometric information, or the like, to provide an indication that the particular transaction is being conducted by the particular employee. In some examples, multiple employee(s) 208 can share employer computing device(s) 202 and can enter a pin, biometric information, or other identifier before each transaction to indicate which employee should receive credit for conducting the particular transaction. The transaction information can further include an amount of the transaction, such as a total amount, amount per item, etc., and can further include a gratuity amount associated with the transaction if any.

The transaction information can include other information such as regarding the time and place of the transaction, information related to the item(s) acquired, a type of payment being used (e.g., cash, check, payment card, electronic payment), as well as additional information, such as customer identifying information. For instance, if a payment card, such as a credit card, debit card, charge card, prepaid card, or the like, is used as a payment instrument, the transaction information can include data stored in the payment card, e.g., Track 1 data (cardholder name, card number and other card information). In addition, when completing the transaction, a customer can sometimes provide an email address for receiving a receipt through email, a phone number for receiving a receipt via text message, or the like. Additional examples of other transaction information that can be captured include detailed item information, e.g., descriptors of the items (size, flavor, color, model, etc.), geolocation data indicating a geographic POS location of a particular transaction, online/offline card data, data describing the employer 204 and/or the employer computing device(s) 202, e.g., a merchant identifier, a merchant category code (MCC), or the like.

The service computing device(s) 210 can receive the transaction information and store the transaction information, e.g., in employer profile(s) 238 and/or employee profile(s) 248.

Block 804 illustrates determining, based at least in part on the transaction information, employee information associated with the employee. As described above, in at least one example, the service computing device(s) 210 can determine employee time information 258, employee sales information 260, employee gratuity information 262, etc. from the transaction information. In some examples, the employee time information 258, the employee sales information 260, the employee gratuity information 262, etc. can be aggregated, processed, and parsed by individual employees. In such examples, data particular to an employee can be stored in a corresponding employee profile 248 with the employee payroll information 226 corresponding to that employee. That is, in at least one example, the service computing device(s) 210 can process aggregated employee time information 258, employee sales information 260, employee gratuity information 262, etc. and/or the employee payroll information 226 from one or more employers to determine employee information associated with a particular employee.

As described above, employee information can indicate historical employee information associated with an employee. For instance, the employee information can indicate previous employer(s) of the employee, previous work schedule(s) of the employee, previous earnings of the employee, previous payroll payments of the employee, previous attendance of the employee, previous hours worked by the employee, previous reviews of the employee, previous feedback of the employee, fraud reports associated with the employee, etc. Furthermore, current employee information can indicate a length of time the employee has worked for a current employer, current and/or future work schedule(s) of the employee, earnings associated with the employee for a current pay period, current attendance of the employee, a number of hours worked by the employee during a current pay period; recently received feedback associated with the employee, etc.

Block 806 illustrates determining, based at least in part on the employee information, a level of reliability of the employee. In some examples, the reliability module 246 can employ one or more statistical models and/or can apply one or more metrics to determine whether the employee is reliable such that it is worth the risk to the employer 204 to provide the employee with access to instant deposits. Thus, the reliability module 246 can determine, e.g., based on the one or more statistical models and/or the one or more metrics, whether the employee is reliable and thus deserving of access to instant deposits.

As described above, examples of suitable metrics include at least one of: whether an employee has had more than a threshold number of employers (which can be indicative of a lack of loyalty or unreliability); whether the length of time that the employee has been employed by the employer 204 meets or exceeds a threshold; whether the employee is scheduled to work at a future time; whether the employee has an attendance record that reflects that the employee is present for scheduled work above a threshold amount of time; whether the employee has a history of inaccurate reporting (which can be indicative of fraud or unreliability); whether the amount of sales of the employee over a recent period of time is substantially less than historical sales; etc. Several examples of suitable statistical models that can be used to predict whether payroll payments should be made in advance for a particular employer can include regression models, such as linear regression models, and stochastic models, such as Markov models, hidden Markov models, and so forth.

In some examples, the reliability module 246 can utilize a data model trained via machine learning mechanisms, as described above. In such examples, the data model can output a value indicative of the reliability of the employee.

Block 808 illustrates determining, based at least in part on the reliability of the employee, whether the employee is eligible for instant deposit. In at least one example, the value output by the data model can be compared to a threshold to determine whether the employee is eligible for instant deposits and/or an amount the employee 204 can collect via an instant deposit. In at least one example, if the reliability module 246 determines that the value corresponding to the reliability of an employee is less than a threshold value, the payroll service can prohibit the employee from collecting payroll payments via instant deposits. In other examples, if the reliability module 246 determines that the reliability associated with an employee is less than a threshold value, the payroll service can dynamically adjust an amount that the employee is permitted to collect via instant deposit prior to a regularly scheduled payday.

Based at least in part on determining that the employee is eligible for instant deposit, the payroll module 236 can facilitate a deposit of an amount of funds associated with compensation owed to the employee via instant deposit, as illustrated in block 810.

In at least one example, the payroll module 236 can receive an indication that the employee is eligible for instant deposit. As described below, the payroll module 236 can utilize the determined reliability of the employee and/or a determined level of risk associated with the employer 204 to determine an amount of funds to be paid to the employee via instant deposit. In some examples, the payroll module 236 can send a notification (e.g., a text message, an email, a push notification, etc.) to an employee computing device 206 operated by the employee to notify the employee that he or she is eligible for instant deposit. Additional details associated with the notification are described below with reference to FIGS. 9 and 10.

In at least one example, the notification can indicate whether the employee has provided employee payroll information 226 sufficient to enable the payroll module 236 to facilitate the instant deposit. If the employee has not yet provided such information, the notification may include a control to enable the employee to provide such information. In at least one example, the employee can interact with the employee computing device 206 to confirm that he or she desires to be paid via instant deposit. Responsive to receiving such a request, the payroll module 236 can facilitate payment via instant deposit. In other examples, if an employee is determined to be eligible for instant deposit, the payroll module 236 can instantly deposit funds in an account of the employee, without sending a notification and receiving a confirmation. That is, in some examples, the notification and/or confirmation may not be used or can be optional.

To facilitate a deposit of an amount of funds via instant deposit, the payroll module 236 can access payroll payment information associated with the employee. As described above, the payroll payment information can specify the amount of funds to be paid to each employee. The payroll payment information can further specify how each employee is to be paid, such as by providing the employee's full name, employee's bank account information, the employee's mailing address and/or various other information about the employee and or the payroll payment to be made to the employee. In at least one example, the payroll module 236 can determine an amount of funds (e.g., a percentage of the total amount owed to the employee) to transfer via an instant deposit based on a risk analysis of the employer 204 and/or reliability analysis of the employee, as described below. The payroll module 236 can then provide a near real-time direct funds transfer to a respective employee account 220 for the employee.

Accordingly, the employee can receive a payroll payment on the same day as the day on which the work was performed and/or a request for instant deposit is made, or at some time earlier than payment would be made in a typical payment cycle (e.g., responsive to a request for an instant deposit). Thus, the service computing device(s) 210 can send an electronic communication that causes the payroll payment to be sent to respective employee account 220 in near real-time, e.g., within a matter of seconds or minutes. For instance, notification of the payroll payment can be received by one or more employee bank computing device(s) 218. In some examples, the payroll payments can be sent via near real-time payment techniques that utilize account information associated with the respective employee account 220. Accordingly, the payroll payment can be received and accessed by the employee on the same day, same hour, and/or same minute as when the payroll payment is initiated by the payroll module 236 and/or the service provider bank. In some examples, the payroll module 236 can receive, on the same day, a confirmation communication that a payroll payment has been received or otherwise deposited into an employee account 220 of an employee.

The employee payroll information maintained for individual employee(s) can include a debit card number corresponding to an employee account 220 of the respective employee. The service provider bank computing device(s) 240 can be configured to communicate with the one or more computing devices of an interbank network (e.g., Pulse®, Cirrus®) which enable near real-time transfer of funds. For example, the interbank network can enable a single message format for fund transfers whereby the service provider bank computing device(s) 240 can communicate directly or indirectly with the employee bank computing device(s) 218 through the interbank network for sending the payroll payment to the employee bank in near real-time, e.g., often in less than one minute, and typically in a matter of several seconds.

Based at least in part on determining that the employee is not eligible for instant deposit, the payroll module 236 can facilitate a deposit of an amount of funds associated with compensation owed to the employee at a scheduled time, as illustrated in block 812. If an employee is not eligible for instant deposit (or the employee does not elect to receive an instant deposit), the payroll module 236 can pay the employee at a time determined by a payment schedule. As described above, such a time can be specified by the employer 204 and/or the employee.

Figure 9:
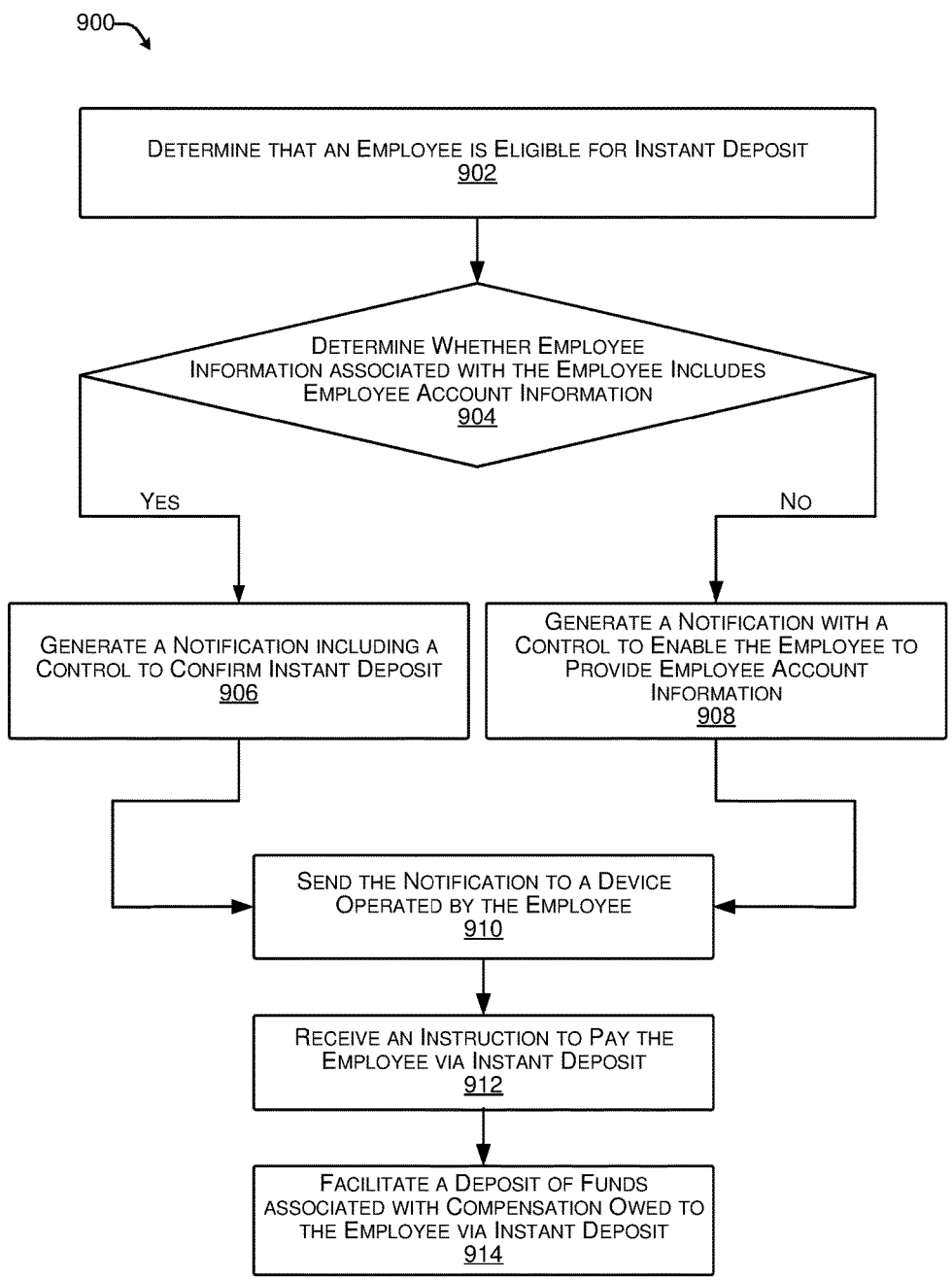
FIG. 9 is a flow diagram illustrating an example process for generating a notification for facilitating an instant deposit according to some implementations.

FIG. 9 is a flow diagram illustrating an example process 900 for generating a notification for facilitating an instant deposit. FIG. 9 is described in the context of the environment and/or device(s) described above with reference to FIGS. 2-4, but is not limited to such environment and/or device(s).

Block 902 illustrates determining that an employee is eligible for instant deposit, as described above with reference to FIG. 8.

Block 904 illustrates determining whether employee payroll information associated with the employee includes employee account information. As described above, the service computing device(s) 210 can store employee profile(s) 248. Employee profile(s) 248 can store data associated with the employee(s) 208. In at least one example, an employee profile 248 of an employee can include employee payroll information 226 (e.g., tax information for an employee, tax withholding information for federal and state taxes, residence information, bank account information, desired payroll payment frequencies according to which the employee is to be paid, etc.). Additionally, an employee profile 248 can include other types of information such as an address, phone number, email address, etc. of the employee.

In at least one example, the payroll module 236 can access an employee profile 248 corresponding to the employee to determine whether the employee profile 248 includes information identifying a bank account (e.g., employee account information) of the employee. If the employee payroll information includes employee account information, the payroll module 236 can generate a notification including a control to confirm instant deposit, as illustrated in block 906. That is, the payroll module 236 can generate a notification that notifies the employee that he or she is eligible for an instant deposit. In some examples, the notification can identify the amount of the instant deposit and/or the employee account information. In at least one example, the notification can include a control, the actuation of which generates an instruction to initiate the instant deposit. That is, the notification can include a control that enables the employee to confirm the instant deposit. As described above, the notification can be a text message, an email, a push notification, etc.

If the employee payroll information does not include employee account information, the payroll module 236 can generate a notification including a control to enable the employee to provide employee account information, as illustrated in block 908. That is, the payroll module 236 can generate a notification that notifies the employee that he or she is eligible for an instant deposit. In some examples, the notification can identify the amount of the instant deposit. In at least one example, the notification can include a request for employee account information. Further, in at least one example, the notification can include a control, the actuation of which enables the employee to input employee account information. For instance, responsive to the employee actuating such a control, an overlay, popup, or other user interface element may be presented to facilitate inputting employee account information.

Block 910 illustrates sending the notification to a device operated by the employee. In at least one example, the payroll module 236 can send the notification to an employee computing device 206 operated by the employee. The employee computing device 206 can present the notification via a display of the employee computing device 206.

Block 912 illustrates receiving an instruction to pay the employee via instant deposit. In at least one example, the employee can interact with the employee computing device 206 to confirm that he or she desires to be paid via instant deposit. For instance, the employee can actuate the control to confirm the instant deposit, which can cause an instruction to be sent from the employee computing device 206 to the payroll module 236. Additionally and/or alternatively, the employee can actuate the control to enable the employee to provide employee account information. Responsive to the employee actuating such a control, the employee can input employee account information via a user interface of the employee computing device 206. For instance, responsive to the employee actuating such a control, an overlay, popup, or other user interface element can be presented to facilitate inputting employee account information. Based at least in part on inputting employee account information, an instruction can be sent from the employee computing device 206 to the payroll module 236 to instruct the payroll module 236 to pay the employee via instant deposit using the employee account information provided.

Based at least in part on receiving the instruction to pay the employee via instant deposit, the payroll module 236 can facilitate a deposit of funds associated with compensation owed to the employee via instant deposit, as illustrated in block 914. To facilitate a deposit of an amount of funds via instant deposit, the payroll module 236 can access payroll payment information associated with the employee. As described above, the payroll payment information can specify the amount of funds to be paid to each employee. The payroll payment information can further specify how each employee is to be paid, such as by providing the employee's full name, employee's bank account information, the employee's mailing address and/or various other information about the employee and or the payroll payment to be made to the employee. In at least one example, the payroll module 236 can determine an amount of funds (e.g., a percentage of the total amount owed to the employee) to transfer via an instant deposit based on a risk analysis of the employer 204 and/or reliability analysis of the employee. The payroll module 236 can then provide a near real-time direct funds transfer to a respective employee account 220 for the employee.

That is, the service computing device(s) 210 can send an electronic communication that causes the payroll payment to be sent to respective employee account 220 in near real-time, e.g., within a matter of seconds or minutes. For instance, notification of the payroll payment can be received by one or more employee bank computing device(s) 218. In some examples, the payroll payments can be sent via near real-time payment techniques that utilize account information associated with the respective employee account 220. Accordingly, the payroll payment can be received and accessed by the employee on the same day, same hour, and/or same minute as when the payroll payment is initiated by the payroll module 236 and/or the service provider bank. In some examples, the payroll module 236 can receive, on the same day, a confirmation communication that a payroll payment has been received or otherwise deposited into an employee account 220 of an employee.

Figure 10:
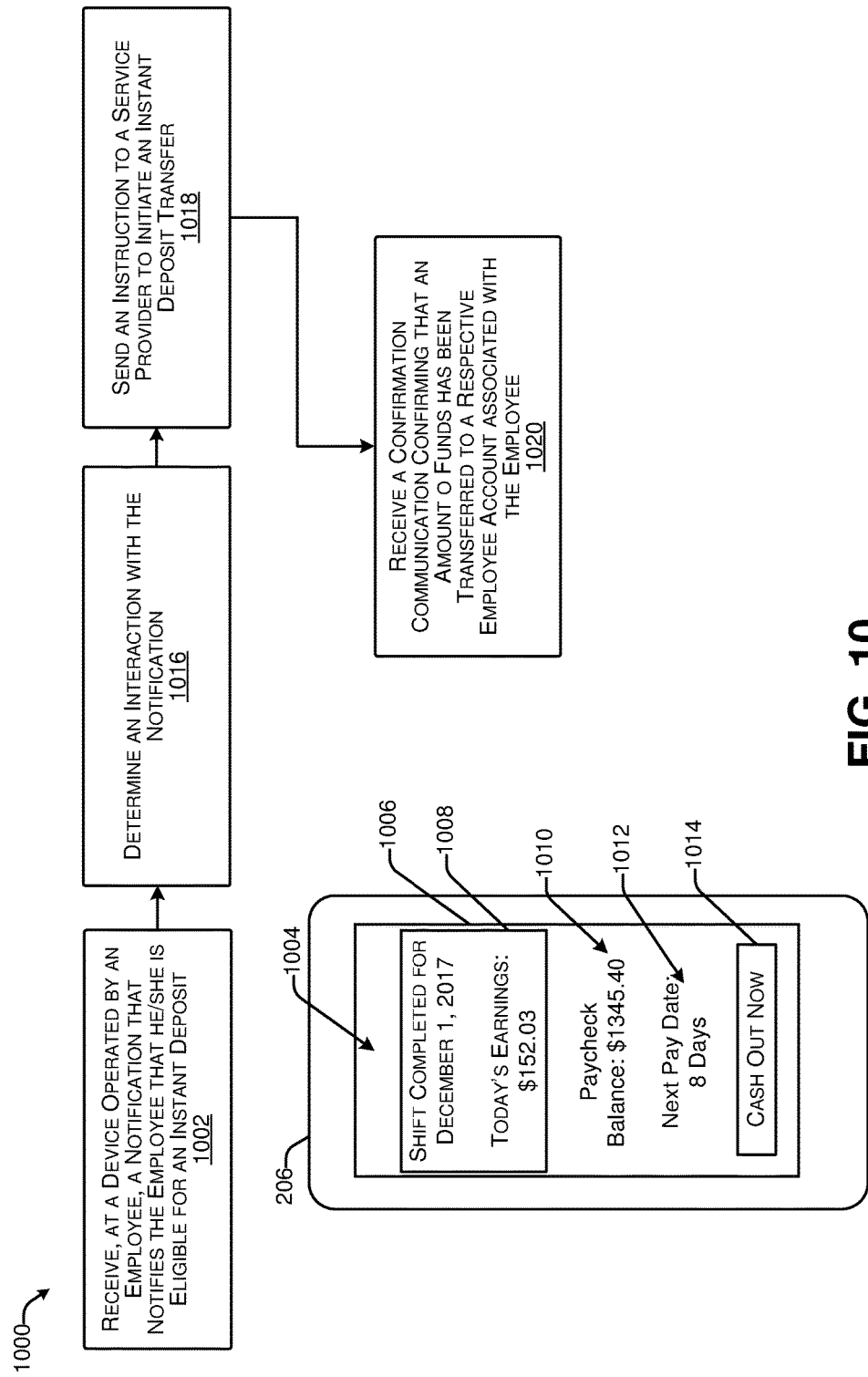
FIG. 10 is a flow diagram illustrating an example process for receiving, at a device operated by an employee, a notification for facilitating an instant deposit.

FIG. 10 is a flow diagram illustrating an example process 1000 for receiving, at a device operated by an employee, a notification for facilitating an instant deposit.

Block 1002 illustrates receiving, at a device operated by an employee (e.g., an employee computing device 206), a notification that notifies the employee that he/she is eligible for an instant deposit. The notification can be a text message, an email, a push notification, etc. As described above, the payroll module 236 can generate a notification that notifies the employee that he or she is eligible for an instant deposit. In at least one example, the payroll module 236 can send the notification to an employee computing device 206 operated by the employee. In some examples, the payroll module 236 can send the notification upon completion of a shift, at a particular time of day, at a particular frequency, at a scheduled time, etc. In at least one example, the application 232 associated with the employee computing device 206 can receive the notification and can present the notification via a display of the employee computing device 206.

A non-limiting example of such a notification 1004, as presented via a display 1006 of an employee computing device 206, is illustrated next to block 1002. In some examples, the notification 1004 can identify an amount earned for a particular shift, as shown in box 1008. Additionally, in some examples, the notification 1004 can include an indication of a total amount of compensation owed to the employee 1010 and upcoming pay date 1012. In at least one example, the notification 1004 can include a request for employee account information and/or a control (not shown in FIG. 10), the actuation of which enables the employee to input employee account information. For instance, responsive to the employee actuating such a control, an overlay, popup, or other user interface element may be presented to facilitate inputting employee account information. Furthermore, in at least one example, the notification 1004 can include a control 1014, the actuation of which enables the employee to request an instant deposit transfer. That is, actuation of the control 1014 can initiate an instant deposit transfer.

Notification 1004 is but one example of a notification that can be presented to an employee. In an alternative example, instead of presenting the total compensation owed to the employee, the notification 1004 can present an amount that an employee is eligible to collect via instant deposit (as determined based on a risk analysis of the employer 204 and/or a reliability analysis of the employee described above). In such an example, the payroll module 236 can determine the appropriate percentage of the total compensation prior to generating the notification 1004.

Block 1016 illustrates determining an interaction with the notification 1004. In at least one example, the application 232 associated with the employee computing device 206 can determine an interaction with the notification 1004. For instance, in at least one example, the employee can interact with the employee computing device 206 to indicate and/or confirm that he or she desires to be paid via instant deposit. For instance, the employee can actuate the control 1014 to indicate and/or confirm the instant deposit.

Block 1018 illustrates sending an instruction to a service provider to initiate an instant deposit transfer. In at least one example, responsive to determining an interaction with the notification 1004, the application 232 associated with the employee computing device 206 can send an instruction to the payroll module 236. Based at least in part on receiving the instruction to pay the employee via instant deposit, the payroll module 236 can facilitate a deposit of funds associated with compensation owed to the employee via instant deposit. In some examples, the funds can correspond to a total amount owed to the employee (e.g., $1345.40) or an appropriate percentage of the total amount, based on a risk analysis of the employer 204 and/or a reliability analysis of the employee, as described herein. The payroll module 236 can then provide a near real-time direct funds transfer to a respective employee account 220 for the employee.

That is, responsive to receiving the instruction the service computing device(s) 210 can send an electronic communication that causes the payroll payment to be sent to respective employee account 220 in near real-time, e.g., within a matter of seconds or minutes. For instance, notification of the payroll payment can be received by one or more employee bank computing device(s) 218. In some examples, the payroll payments can be sent via near real-time payment techniques that utilize account information associated with the respective employee account 220. Accordingly, the payroll payment can be received and accessed by the employee on the same day, same hour, and/or same minute as when the payroll payment is initiated by the payroll module 236 and/or the service provider bank. In some examples, the payroll module 236 can receive, on the same day, a confirmation communication that a payroll payment has been received or otherwise deposited into an employee account 220 of an employee. In some examples, the payroll module 236 can forward the confirmation communication (or generate a new confirmation communication) to the employee computing device 206. That is, in at least one example, the application 232 associated with the employee computing device 206 can receive a confirmation communication confirming that an amount of funds has been transferred to a respective employee account 220 associated with the employee, as illustrated in block 1020.

Figure 11:
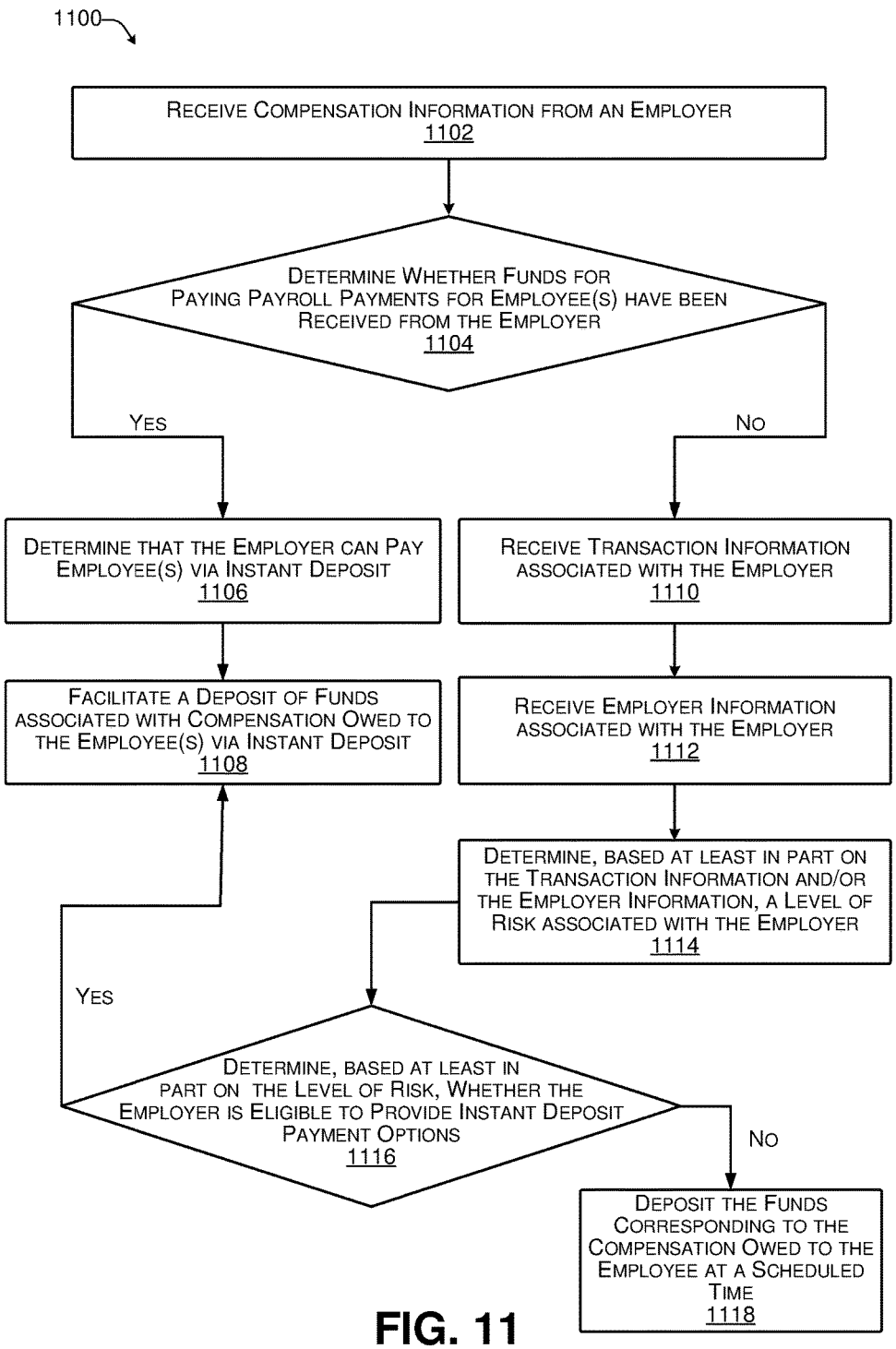
FIG. 11 is a flow diagram illustrating an example process for determining whether an employer is eligible to provide instant deposit payment options to its employees according to some implementations.

FIG. 11 is a flow diagram illustrating an example process 1000 for determining whether an employer is eligible to provide instant deposit payment options to its employees. FIG. 11 is described in the context of the environment and/or device(s) described above with reference to FIGS. 2-4, but is not limited to such environment and/or device(s).

Block 1102 illustrates receiving compensation information from an employer. In at least one example, the employer computing device(s) 202 can send compensation information 228 to the service computing device(s) 210. As described above, the compensation information 228 can include an indication of an amount that each employee is to be paid, including wages, salary, bonuses, commission, tips or other gratuities, garnishments, and the like. For example, the compensation information 228 can include whether a particular employee is paid by the hour or by a salary, how much the employee is to be paid, whether the employee is eligible for overtime, whether the employee is eligible for a commission or bonus, whether the employee receives gratuity income, and so forth. Furthermore, the compensation information 228 can include one or more employer-established rules for making payments to the employee(s), such as conditions under which commissions or bonuses can be paid, rules for distributing gratuity income, and so forth.

In at least one example, the payroll module 236 can utilize the compensation information 228, in addition to employee payroll information 226 and/or transaction information, to determine payroll processing information. The payroll processing information can include amounts of payroll payments due to be paid to each employee of the employer, amounts of taxes to withhold for each employee, when to make a payroll payment to each employee, how to make the payroll payments to each employee (e.g., check, direct deposit, etc.), and so forth. Furthermore, the payroll processing information can include an amount of time worked by individual employee(s) over a most recent pay period (e.g., in the example that the employee(s) work for an hourly wage), sales totals for individual employee(s) (e.g., in the example that the employee(s) work for sales commissions), gratuity information for individual employee(s) (e.g., in the example that the employee(s) receive gratuities), etc. In at least one example, the payroll processing information can be utilized to determine payroll payment information, as described above. That is, the payroll module 236 can determine payroll payment information based on payroll processing information.

Block 1104 illustrates determining whether funds for paying payroll payments for employee(s) has been received from the employer. As described above, the payroll module 236 can send a total payroll payment amount to the employer bank computing device(s) 214 to request transfer of funds to the service provider bank. In response to receiving the request for transfer of the total payroll payment amount, the employer bank computing device(s) 214 can facilitate the transfer of the total amount of the payroll payments to the service provider bank. For example, the employer bank can transfer funds to the service provider bank, via the respective computing device(s), using any suitable money transferring technique, and typically can use a batch-processed transfer of funds. As described above, in some examples, the payroll module 236 can make payroll payments to the respective employee(s) 208 prior to completion of the batch fund transfer from the employer bank to the service provider bank. Accordingly, prior to making such payroll payments, the payroll module 236 can query the service provider bank and/or access the service provider account 242 to determine whether the funds have been received by the service provider bank.

Based at least in part on determining that funds have been received, the payroll module 236 can determine that the employer can pay employee(s) via instant deposit, as illustrated in block 1106. Block 1108 illustrates facilitating a deposit of funds associated with compensation owed to the employee(s) via instant deposit. As described above, based at least in part on receiving an instruction to pay an employee via instant deposit, the payroll module 236 can facilitate a deposit of funds associated with compensation owed to the employee via instant deposit. To facilitate a deposit of an amount of funds via instant deposit, the payroll module 236 can access the payroll payment information associated with the employee. As described above, the payroll payment information can specify the amount of funds to be paid to each employee. The payroll payment information can further specify how each employee is to be paid, such as by providing the employee's full name, employee's bank account information, the employee's mailing address and/or various other information about the employee and or the payroll payment to be made to the employee. In at least one example, the payroll module 236 can determine an amount of funds (e.g., a percentage of the total amount owed to the employee) to transfer via an instant deposit based on a risk analysis of the employer 204 and/or reliability analysis of the employee. The payroll module 236 can then provide a near real-time direct funds transfer to a respective employee account 220 for the employee.

That is, the service computing device(s) 210 can send an electronic communication that causes the payroll payment to be sent to respective employee account 220 in near real-time, e.g., within a matter of seconds or minutes. For instance, notification of the payroll payment can be received by one or more employee bank computing device(s) 218. In some examples, the payroll payments can be sent via near real-time payment techniques that utilize account information associated with the respective employee account 220. Accordingly, the payroll payment can be received and accessed by the employee on the same day, same hour, and/or same minute as when the payroll payment is initiated by the payroll module 236 and/or the service provider bank. In some examples, the payroll module 236 can receive, on the same day, a confirmation communication that a payroll payment has been received or otherwise deposited into an employee account 220 of an employee.

Based at least in part on determining that funds have not been received, the payroll module 236 can perform a risk analysis to determine whether the employer can pay employee(s) via instant deposit.

Block 1110 illustrates receiving transaction information associated with the employer. As described above, the employer computing device(s) 202 can facilitate POS transactions between the employer 204 and one or more customers. In at least one example, the merchant application 250 on the employer computing device(s) 202 can send transaction information to the service computing device(s) 210, e.g., while the transaction is being conducted at the POS location. In at least one example, the transaction information for a transaction can include an employee identifier associated with the particular employee that is conducting the transaction. The transaction information can include other information such as regarding the time and place of the transaction, information related to the item(s) acquired, a type of payment being used (e.g., cash, check, payment card, electronic payment), as well as additional information, such as customer identifying information. For instance, if a payment card, such as a credit card, debit card, charge card, prepaid card, or the like, is used as a payment instrument, the transaction information can include data stored in the payment card, e.g., Track 1 data (cardholder name, card number and other card information). In addition, when completing the transaction, a customer can sometimes provide an email address for receiving a receipt through email, a phone number for receiving a receipt via text message, or the like. Additional examples of other transaction information that can be captured include detailed item information, e.g., descriptors of the items (size, flavor, color, model, etc.), geolocation data indicating a geographic POS location of a particular transaction, online/offline card data, data describing the employer 204 and/or the employer computing device(s) 202, e.g., a merchant identifier, a merchant category code (MCC), or the like.

The service computing device(s) 210 can receive the transaction information and store the transaction information, e.g., in employer profile(s) 238.

Block 1112 illustrates receiving employer information associated with the employer. In at least one example, the service computing device(s) 210 can receive employer information associated with the employer 204. The employer information associated with an employer 204, as described above, can indicate a value (or predicted value) of business(es) of the employer 204, amounts (or predicted amounts) of funds in account(s) (e.g., employer account 216) of the employer 204, debits (or predicted debits) of the employer 204, a length of time business(es) of the employer 204 have been open for business, a chargeback history of the employer 204, a fraud history of the employer 204, feedback associated with the employer 204, inventory of the employer 204, etc.

Block 1114 illustrates determining, based at least in part on the transaction information and/or the employer information, a level of risk associated with the employer. The risk module 244 can determine a likelihood that the employer 204 will be able to pay the payroll service provider for the payroll payment based on various factors determined about the employer 204 and/or the employer's business. For instance, the risk module 244 can access employer information, as described above.

In some examples, the risk module 244 can employ one or more statistical models and/or can apply one or more metrics to determine whether the employer 204 is likely to be able to pay for the payroll payments, and further, can apply one or more additional metrics to guard against the possibility of fraud by an employee or an otherwise incorrect payroll payment amount. Thus, the risk module 244 can determine, e.g., based on the one or more statistical models and/or the one or more metrics, whether the employer is likely to have sufficient funds to pay for the one or more payroll payments. In some examples, the risk module 244 can utilize a data model trained via machine learning mechanisms, as described above with reference to FIG. 5. In such examples, the risk module 244 can output a level of risk associated with the employer 204.

Block 1116 illustrates determining, based at least in part on the level of risk, whether the employer is eligible to provide instant deposit payment options. As described above, the risk module 244 can output a level of risk associated with the employer 204, which can be compared to a threshold to determine whether instant deposits are permitted and/or an amount of funds that can be paid via instant deposits made on behalf of the employer 204. For instance, in at least one example, if the risk module 244 determines that the risk associated with an employer 204 meets or exceeds a threshold level of risk, the payroll service can await completion of the batch fund transfer prior to sending the payroll payments. That is, in at least one example, if the risk module 244 determines that the risk associated with an employer 204 meets or exceeds a threshold level of risk, the payroll module 246 can deposit the funds associated with the compensation owed to the employee at a scheduled time, as illustrated in block 1118. In other examples, if the risk module 244 determines that the risk associated with an employer 204 meets or exceeds a threshold level of risk, the payroll service can dynamically adjust an amount that the employer 204 is permitted to pay prior to completion of the batch fund transfer and/or via instant deposit.

If the risk module 244 determines that the risk associated with an employer 204 is below a threshold level of risk, the payroll module 236 can facilitate a deposit of funds associated with compensation owed to the employee via instant deposit, as illustrated in block 1108, and as described above.

Figure 12:
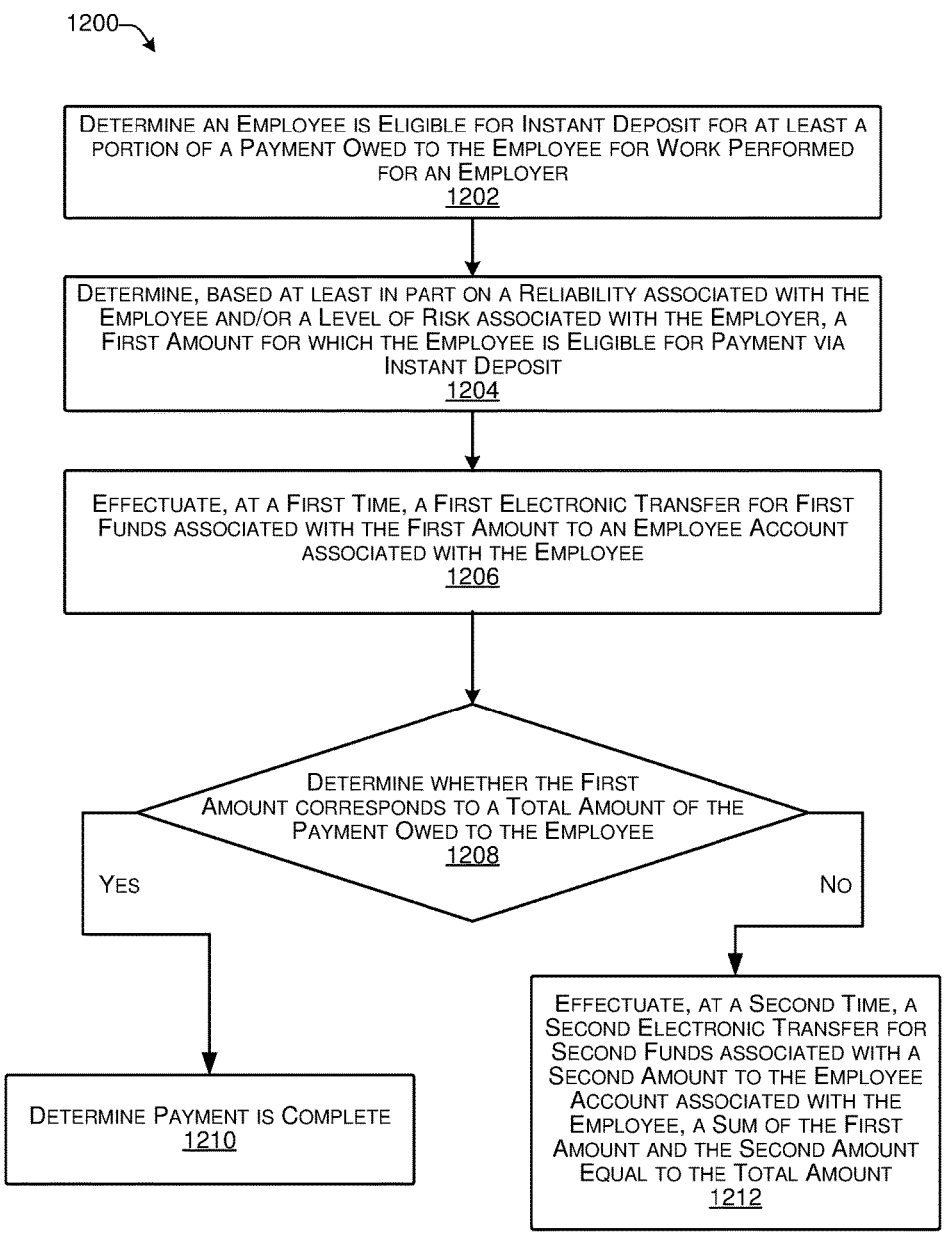
FIG. 12 is a flow diagram illustrating an example process for selecting payroll amounts for instant payroll deposits according to some implementations.

FIG. 12 is a flow diagram illustrating an example process 1100 for selecting payroll amounts for instant payroll deposits. FIG. 12 is described in the context of the environment and/or device(s) described above with reference to FIGS. 2-4, but is not limited to such environment and/or device(s).

Block 1202 illustrates determining that an employee is eligible for instant deposit for at least a portion of a payment owed to the employee for work performed for an employer. In at least one example, the reliability module 246 can perform a reliability analysis based on employee information and/or employee payroll information to determine a value indicative of the reliability of an employee. So long as the value meets or exceeds a threshold value, the reliability module 246 can determine that the employee is eligible to receive instant deposits. Additional details associated with determining that an employee is eligible for instant deposit for at least a portion of a payment owed to the employee are described above with reference to FIG. 8.

Block 1204 illustrates determining, based at least in part on the reliability associated with the employee and/or a level of risk associated with the employer, a first amount for which the employee is eligible for payment via instant deposit. In some examples, the payroll module 236 can determine to pay an employee a total amount of the compensation owed to the employee via instant deposit. In other examples, the payroll module 236 can determine to pay an employee less than the total amount of the compensation owed to the employee via instant deposit. In such examples, the payroll module 236 can utilize the reliability associated with the employee and/or a level of risk associated with the employer 204 to determine the amount.

As described above, the risk module 244 can analyze risk associated with an employer 204. The determined level of risk can be used by the payroll module 236 to determine an amount of compensation owed to the employee that can be paid to the employee via instant deposit. Further, in at least one example, the payroll module 236 can utilize the value indicative of reliability to determine an amount of the compensation owed to the employee that can be paid to the employee via instant deposit. In at least one example, the payroll module 236 can utilize a data model trained via a machine learning mechanism, as described above with reference to FIG. 7, to determine an amount of compensation to pay to the employee via instant deposit. In at least one example, the data model can output an appropriate percentage of the total compensation owed to the employee, or some other indicator of the amount that is to be paid via instant deposit.

As a non-limiting example, in an example where an employee has worked for the employer 204 for five years, has sales exceeding a threshold, and is scheduled to work 40 hours in an upcoming week, and the employer 204 has been in business for 10 years and has no history of fraud, the payroll module 236 can determine to pay the employee a total amount of the compensation owed to the employee via instant deposit. However, in an example where an employee is a new employee and has worked for the employer 204 for five days and is scheduled to work 10 hours in an upcoming week, and the employer 204 has been in business for 10 years and has no history of fraud, the payroll module 236 can determine to pay the employee less than the total amount of the compensation owed to the employee via instant deposit. In an alternative example where an employee has worked for the employer 204 for five years, has sales exceeding a threshold, and is scheduled to work 40 hours in an upcoming week, and the employer 204 has been in business for less than one year and has a history of chargebacks, the payroll module 236 can determine to pay the employee less than the total amount of the compensation owed to the employee via instant deposit.

Block 1206 illustrates effectuating, at a first time, a first electronic transfer for first funds associated with the first amount to an employee account associated with the employee. That is, block 1206 illustrates effectuating an instant deposit of funds associated with a first amount into an employee account associated with the employee. To facilitate a deposit of an amount of funds via instant deposit, the service computing device(s) 210 can send an electronic communication that causes the payroll payment to be sent to respective employee account 220 in near real-time, e.g., within a matter of seconds or minutes. For instance, notification of the payroll payment can be received by one or more employee bank computing device(s) 218. In some examples, the payroll payments can be sent via near real-time payment techniques that utilize account information associated with the respective employee account 220. Accordingly, the payroll payment can be received and accessed by the employee on the same day, same hour, and/or same minute as when the payroll payment is initiated by the payroll module 236 and/or the service provider bank. In some examples, the payroll module 236 can receive, on the same day, a confirmation communication that a payroll payment has been received or otherwise deposited into an employee account 220 of an employee.

Block 1208 illustrates determining whether the first amount corresponds to a total amount of the payment owed to the employee. As described above, in some examples, the payroll module 236 can dynamically modify an amount of funds paid to an employee based on risk and/or reliability analyses. Accordingly, the payroll module 236 can determine whether the first amount equals a total amount owed to an employee. If the first amount corresponds to the total amount owed to the employee, the payroll module 236 can determine that the payment is complete, as illustrated in block 1210.

If the first amount corresponds to an amount less than the total amount, the payroll module 236 can effectuate, at a second time, a second electronic transfer for second funds associated with a second amount to an employee account associated with the employee, as illustrated in block 1212. In at least one example, a sum of the first amount and the second amount can equal the total amount of the payment owed to the employee. Accordingly, block 1212 illustrates effectuating an instant deposit of funds associated with remaining amount owed to the employee into an employee account associated with the employee. The second time can be some time after the first time, e.g., at a time indicated per a schedule determined by the employer 204 and/or the employee.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A system comprising:
one or more processors; and
one or more computer-readable media storing instructions executable by the one or more processors, wherein the instructions program the one or more processors to implement a payroll service to:
receive employee payroll information indicating an employee account at which an employee is to receive payroll payments from an employer;
receive employer information indicating an employer account, wherein the employer account is associated with the payroll service, and wherein the employer account is an account from which the employer is to pay the payroll payments;
receive, from a first device operated by the employee, compensation information indicating compensation to be received by the employee for performing work for the employer, the first device having installed thereon an employee application for, at least, sending the compensation information to the payroll service via a network;
determine that the employer account has not received payroll funds, from a bank account associated with the employer, corresponding to the compensation to be received by the employee;
analyze employee information to calculate a reliability level of the employee, wherein the employee information includes at least one of a previous employer of the employee, an amount of time worked by the employee, an amount of sales made by the employee, or an upcoming schedule for the employee;
determine that the reliability level satisfies a threshold indicating that the employee is eligible for instant deposits;
receive transaction information associated with a plurality of transactions between the employer and customers, wherein the transaction information for an individual transaction of the plurality of transactions comprises at least an amount of the individual transaction and a type of payment instrument used for the individual transaction;
determine, based at least in part on the employer information and the transaction information, a level of risk associated with the employer;
determine an amount of funds to deposit in to the employee account based at least in part on the level of risk and the reliability level, wherein the amount of funds is equal to a first portion of the compensation to be received by the employee;
generate, based at least in part on determining that the reliability level satisfies the threshold, a notification to inform the employee that the employee is eligible for instant deposits;
send the notification to the first device operated by the employee, the notification being presented by the employee application via a user interface enabling the customer to initiate an instant deposit, wherein the instant deposit causes the amount of funds to be deposited in to the employee account;
receive, responsive to sending the notification to the first device, an instruction to initiate the instant deposit;

effectuate, at a first time that is before the employer account has received the payroll funds from the bank account associated with the employer, and responsive to the instruction to initiate the instant deposit, the deposit of the amount of funds in to the employee account; and effectuate, at a second time after the first time, the deposit of an additional amount of funds equal to a second portion of the compensation in to the employee account, wherein a sum of the first portion and the second portion is equal to a total amount of the compensation.

2. The system as claim 1 recites, wherein the instructions program the one or more processors to implement the payroll service further to:

determine that the employer account does not have enough funds to transfer the total amount of the compensation to the employee account;

determine that the level of risk is below a threshold level of risk; and determine that the employer is eligible to pay the employee via the instant deposit despite not having enough funds in the employer account to transfer the total amount of the compensation to the employee account.

3. A method implemented by one or more computers, the method comprising:

receiving employee payroll information indicating an employee account at which an employee is to receive payroll payments from an employer of the employee;

receiving employer information indicating at least an employer account of the employer;

receiving compensation information indicating compensation to be received by the employee for performing work for the employer;

determining that the employer account has not received payroll funds, from a bank account associated with the employer, corresponding to the compensation to be received by the employee;

analyzing, based at least in part on a data model associated with a plurality of employees, employee information to determine a reliability level associated with the employee;

calculating, based on the reliability level of the employee, a first amount of the compensation to pay to the employee via an instant deposit transfer;

generating a notification to inform the employee that the employee is eligible to receive at least the first amount of the compensation via the instant deposit transfer and an indication of the first amount of the compensation;

sending the notification to a device operated by the employee;

receiving, from the device operated by the employee, an indication of an interaction between the employee and the notification, the interaction being associated with a confirmation to initiate the instant deposit transfer of the first amount to the employee account; and upon receiving the indication of the interaction, facilitating, at a first time that is before the employer account has received the payroll funds from the bank account associated with the employer, transfer of the first amount of compensation to the employee account.

4. The method as claim 3 recites, further comprising:

receiving transaction information from at least the employer, wherein the transaction information is associated with one or more transactions between the employer and one or more customers, and wherein the transaction information for an individual transaction of the one or more transactions comprises at least an amount of the individual transaction, and a type of payment instrument used for the individual transaction; and determining, based at least in part on the transaction information, employee information indicating at least one of a previous employer of the employee, an amount of time worked by the employee, an amount of sales made by the employee, gratuities received by the employee, or an upcoming schedule for the employee.

5. The method as claim 4 recites, further comprising:

determining that the reliability level satisfies a threshold; and determining that the employee is eligible to receive at least the first amount of the compensation via the instant deposit transfer based at least in part on determining that the reliability level satisfies the threshold.

6. The method as claim 3 recites, further comprising:

generating a notification to inform the employee that the employee is eligible to receive at least the first amount of the compensation via the instant deposit transfer;

sending the notification to a device operated by the employee;

receiving, responsive to sending the notification, an instruction to initiate the instant deposit transfer of the first amount to the employee account; and effectuating the instant deposit transfer of the first amount to the employee account based at least in part on receiving the instruction.

7. The method as claim 6 recites, wherein:

the notification comprises at least one of a text message, an email, or a push notification; and the notification includes a control, an actuation of which generates the instruction.

8. The method as claim 3 recites, further comprising:

receiving transaction information associated with one or more transactions between the employer and one or more customers;

determining, based at least in part on the employer information and the transaction information, a level of risk associated with the employer; and calculating the first amount based at least in part on the level of risk.

9. The method as claim 8 recites, further comprising:

determining that the level of risk is below a threshold level of risk; and determining that the employer is permitted to pay employees via instant deposit based at least in part on the level of risk being below the threshold level of risk.

10. The method as claim 3 recites, further comprising:

determining that the first amount is less than a total amount of the compensation; and effectuating, at a second time, an instant deposit transfer of second funds associated with a second amount of the compensation to the employee account, wherein a sum of the first amount and the second amount is equal to the total amount of the compensation.

11. A method implemented by one or more computers, the method comprising:

receiving compensation information indicating compensation to be received by an employee for performing work for an employer;

determining that an employer account associated with a payroll service has not received funds to pay a total amount of the compensation to be received by the employee;

determining, based at least in part on a data model associated with one or more employers, a level of risk associated with the employer;

determining, based at least in part on the level of risk, to pay the employee at least a portion of the total amount of the compensation prior to receiving the funds;

determining, based on at least one of a reliability level of the employee or the level of risk, a first amount of the compensation to pay to the employee via an instant deposit transfer; and upon receiving an indication to initiate the instant deposit transfer, facilitating, at a first time, transfer of the first amount of compensation to the employee account.

12. The method as claim 11 recites, further comprising:

receiving transaction information from at least the employer, the transaction information being associated with one or more transactions between the employer and one or more customers;

determining, based at least in part on the transaction information, employee information indicating at least one of a previous employer of the employee, an amount of time worked by the employee, an amount of sales made by the employee, gratuities received by the employee, or an upcoming schedule for the employee; and determining, based at least in part on the employee information, the reliability level of the employee.

13. The method as claim 12 recites, further comprising:

determining that the reliability level satisfies a threshold; and determining that the employee is eligible for instant deposit transfers based at least in part on the reliability level satisfying the threshold.

14. The method as claim 13 recites, further comprising, based at least in part on determining that the employee is eligible for instant deposit transfers:

accessing employee payroll information associated with the employee;

determining that the employee payroll information does not include an employee account at which the employee is to receive payroll payments from the employer;

generating a notification to inform the employee that the employee is eligible for instant deposit transfers and request account information associated with the employee account;

sending the notification to a device operated by the employee; and facilitating the instant deposit transfer based at least in part on receiving the account information.

15. The method as claim 13 recites, further comprising, based at least in part on determining that the employee is eligible for instant deposit transfers:

accessing employee payroll information associated with the employee;

determining that the employee payroll information includes an employee account at which the employee is to receive payroll payments from the employer;

generating a notification to inform the employee that the employee is eligible for instant deposit, the notification including at least some identification data associated with the employee account;

sending the notification to a device operated by the employee; and facilitating the instant deposit transfer based at least in part on receiving a confirmation that the employee desires to receive at least the first amount via the instant deposit transfer.

16. The method as claim 11 recites, further comprising:

receiving employer information indicating the employer account from which the employer is to pay payroll payments;

receiving transaction information associated with one or more transactions between the employer and one or more customers; and determining, based at least in part on the employer information and the transaction information, the level of risk associated with the employer.

17. The method as claim 16 recites, further comprising:

determining that the level of risk is below a threshold; and determining to pay the employee at least the portion of the compensation prior to receiving the funds based at least in part on determining that the level of risk is below the threshold.

18. The method as claim 11 recites, further comprising:

determining that the first amount is less than the total amount; and facilitating, at a second time, an instant deposit transfer of a second amount of the compensation to the employee account, wherein a sum of the first amount and the second amount is equal to the total amount of the compensation.

19. The system as claim 1 recites, further comprising a second device associated with the employer, the second device having installed thereon an employer application for sending the employer information to the payroll service via the network, wherein receiving the employer information comprises receiving the employer information from the second device, the second device having installed thereon an employer application for sending the employer information to the payroll service via the network.

20. The system as claim 1 recites, further comprising a second device associated with the employer, the second device having installed thereon a merchant application that configures the second device as a point-of-sale (POS) terminal for sending the transaction information to the payroll service via the network, wherein receiving the transaction information comprises receiving the transaction information from the second device.

* * * * *